US008607904B2

(12) United States Patent
Fukumoto et al.

(10) Patent No.: US 8,607,904 B2
(45) Date of Patent: Dec. 17, 2013

(54) WORKING VEHICLE

(75) Inventors: Takeshi Fukumoto, Osaka (JP);
 Keisuke Iwamura, Osaka (JP); Shinya Kawashiri, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 13/390,218

(22) PCT Filed: Aug. 30, 2011

(86) PCT No.: PCT/JP2011/069610
 § 371 (c)(1),
 (2), (4) Date: Feb. 13, 2012

(87) PCT Pub. No.: WO2012/029783
 PCT Pub. Date: Mar. 8, 2012

(65) Prior Publication Data
 US 2012/0217071 A1   Aug. 30, 2012

(30) Foreign Application Priority Data

Aug. 31, 2010  (JP) .................................. 2010-193099
Jun. 10, 2011  (JP) .................................. 2011-130521
Jun. 10, 2011  (JP) .................................. 2011-130527

(51) Int. Cl.
 *B62D 55/02* (2006.01)
(52) U.S. Cl.
 USPC ....... 180/9.34; 180/9.25; 180/9.21; 180/9.26; 180/9.46; 180/9.36
(58) Field of Classification Search
 USPC ..................... 180/9.34, 9.25, 9.21, 9.26, 9.46
 See application file for complete search history.

(56) References Cited

U.S. PATENT DOCUMENTS

| 5,273,126 | A | 12/1993 | Reed et al. | |
| 5,954,148 | A | 9/1999 | Okumura et al. | |
| 6,199,646 | B1 * | 3/2001 | Tani et al. | 180/9.21 |
| 6,334,496 | B1 | 1/2002 | Hiraki et al. | |
| 6,890,042 | B2 * | 5/2005 | Inaoka et al. | 305/173 |
| 7,328,760 | B2 * | 2/2008 | Inaoka et al. | 180/9.21 |

FOREIGN PATENT DOCUMENTS

| JP | 10-045051 | 2/1998 |
| JP | 11-091645 | 4/1999 |
| JP | 2001-058587 | 3/2001 |
| JP | 2004-217054 | 8/2004 |
| JP | 2006-096199 | 4/2006 |
| JP | 2008-230582 | 10/2008 |
| JP | 2008-302737 | 12/2008 |

* cited by examiner

*Primary Examiner* — Tashiana Adams
*Assistant Examiner* — Marlon Arce
(74) *Attorney, Agent, or Firm* — Jordan and Hamburg LLP

(57) ABSTRACT

A working vehicle is structured to maintain a ride quality for an operator on a control seat. Provided are a travel machine body which mounts an engine, front wheels on the machine body, a track frame on the machine body, right and left travel crawlers installed on the track frame, a rear axle which transmits a rotating force to the travel crawler, and oscillation supporting point shafts which support the track frame on the machine body so as to freely oscillate. In the case that the rear axle and the oscillation supporting point shafts are provided so as to be spaced, the oscillation supporting point shafts are arranged just below an axle case to which the rear axle is pivoted, and the track frame is connected to the axle case via link members provided in the oscillation supporting point shafts.

10 Claims, 36 Drawing Sheets

ID
WORKING VEHICLE

TECHNICAL FIELD

The present invention relates to a working vehicle such as a tractor in which right and left travel crawlers are installed in a rear portion of a machine body mounting an engine or the like thereon.

BACKGROUND OF THE INVENTION

It is described in Patent Literatures 1 to 3 as a prior art that right and left travel crawlers are installed in a rear portion of a machine body in a travel vehicle such as a tractor, that is, right and left front wheels are installed in a front portion of the machine body, and the right and left travel crawlers are installed in the rear portion of the machine body.

The prior art is a structure in which a rear axle is pivoted to a rear axle case of a travel machine body, a drive wheel body is attached to the rear axle, a track frame extending in a back and forth direction is arranged at a position which is below the rear axle case, and a travel crawler is installed to the track frame, wherein an approximately midstream portion in the back and forth direction of the track frame is rotatably pivoted to the travel machine body side such as the rear axle case by one oscillation supporting point shaft which is arranged at a position which is at an appropriate distance below the rear axle, and the track frame is structured such that a front portion and a rear portion thereof move up and down in a reverse direction to each other. The travel machine body is structured such as to be moved forward or moved backward by winding a travel crawler in an approximately triangular shape around a front driven wheel body which is provided in a front end side of the track frame, a rear driven wheel body which is provided in a rear end side, and the drive wheel body, and rotating the travel crawler by the drive wheel body.

Citation List

Patent Literature 1: Japanese Unexamined Patent Publication No. 10-45051
Patent Literature 2: Japanese Unexamined Patent Publication No. 2006-96199
Patent Literature 3: Japanese Unexamined Patent Publication No. 2004-217054

SUMMARY OF THE INVENTION

The prior art mentioned above has a problem mentioned below because the travel crawler grounded on a ground surface rotates around the oscillation supporting point shaft in such a manner as to be inclined upward to a front side or be inclined downward to a front side, at a time of pitching such that a front portion of the travel machine body moves up and down. For example, in the case of climbing over a convex portion such as a linch of a farm field, at a time of moving forward or moving backward, the travel crawler is inclined upward to the front side or downward to the front side around the oscillation supporting point shaft, and an angle of incline in the back and forth direction of the ground surface of the travel crawler tends to become larger. Accordingly, a ground height of the travel machine body tends to be changed, and there is such a problem that it is impossible to maintain a good ride quality of an operator boarding on a control seat. Further, since a support of the track frame to the travel machine body is a one-point support by the oscillation supporting point shaft, a load is concentrated on the oscillation supporting point shaft portion so as to prevent an enlargement in size, and there is further such a problem that a malfunction is generated due to a deformation of the oscillation supporting point shaft portion or the like.

The object of the present invention id to provide a working vehicle such as a tractor to which an improvement is applied after making a study of these actual conditions.

A working vehicle according to the first aspect of the invention is provided with a travel machine body which mounts an engine thereon, right and left front wheels which are provided in a lower side of a front portion of the travel machine body, a track frame which is provided in a lower side of a rear portion of the travel machine body, right and left travel crawlers which are installed to the track frame, a rear axle which transmits a rotating force to the travel crawler, and an oscillation supporting point shaft which supports the track frame to the travel machine body so as to freely oscillate, the rear axle and the oscillation supporting point shaft are provided so as to be spaced, the oscillation supporting point shaft is arranged just below an axle case to which the rear axle is pivoted, and the track frame is connected to the axle case via a link member which is provided in the oscillation supporting point shaft.

According to the second aspect of the invention, in the working vehicle according to the first aspect of the invention, the oscillation supporting point shaft is formed by front and rear upper end pivot shafts and front and rear lower end pivot shafts, the front and rear upper end pivot shafts are provided in the axle case, the front and rear lower pivot shafts are provided in the track frame, and upper and lower end portions of the front and rear link members are connected to the pivot shafts.

According to the third aspect of the invention, in the working vehicle according to the second aspect of the invention, it is further provided with a plurality of rolling wheels which is provided in the track frame and support a ground side of the travel crawler, the front and rear upper end pivot shafts are arranged so as to be divided into a front side and a rear side of the rear axle, and one of the front and rear lower end pivot shafts is arranged in an upper surface side between the plurality of rolling wheels in the upper surface side of the track frame.

According to the fourth aspect of the invention, in the working vehicle according to the third aspect of the invention, a rear portion ground side of the travel crawler is supported to the track frame via the driven wheel body, and the other of the front and rear lower end pivot shafts is arranged in the upper surface side of the track frame and between the rolling wheel which is adjacent to the driven wheel body in the plurality of rolling wheels and the driven wheel body.

According to the fifth aspect of the invention, in the working vehicle according to any one of the second to fourth aspects of the invention, the front and rear link members are arranged so as to be tapered in a side elevational view of the machine body, and a distance in the upper end side of the front and rear link members is larger than a distance in the lower end side of the front and rear link members.

According to the sixth aspect of the invention, in the working vehicle according to any one of the second to fourth aspects of the invention, the front and rear upper end pivot shafts are arranged in the vicinity of a drive resultant force line in a forward moving side of the travel crawler, the front side upper end pivot shaft is arranged below the drive resultant force line, and a center of an oscillating locus of the track frame is blow the drive resultant force line.

According to the seventh aspect of the invention, in the working vehicle according to any one of claims the second to fourth aspects of the invention, the front and rear lower end pivot shafts are provided in the track frame within a lateral width of the travel crawler, and each of the lower end sides of the front and rear link members is offset to the track frame side.

According to the first aspect of the invention, it is provided with the travel machine body which mounts the engine thereon, the right and left front wheels which are provided in the lower side of the front portion of the travel machine body, the track frame which is provided in the lower side of the rear portion of the travel machine body, the right and left travel crawlers which are installed to the track frame, the rear axle which transmits the rotating force to the travel crawler, and the oscillation supporting point shaft which supports the track frame to the travel machine body so as to freely oscillate, the rear axle and the oscillation supporting point shaft are provided so as to be spaced, the oscillation supporting point shaft is arranged just below the axle case to which the rear axle is pivoted, and the track frame is connected to the axle case via the link member which is provided in the oscillation supporting point shaft. Accordingly, even if the travel crawler is inclined upward to the front side or downward to the front side around the oscillation supporting point shaft, for example, in the case of climbing over the convex portion of the linch of the farm field or the like, at a time of moving forward or moving backward, the angle of incline in the back and forth direction of the ground surface of the travel crawler becomes smaller than the conventional one. In other words, the ground height of the travel machine body is hard to be changed in comparison with the conventional one, and it is possible to maintain a ride quality of an operator boarding on the control seat in a good state.

According to the second aspect of the invention, the oscillation supporting point shaft is formed by the front and rear upper end pivot shafts and the front and rear lower end pivot shafts, the front and rear upper end pivot shafts are provided in the axle case, the front and rear lower pivot shafts are provided in the track frame, and the upper and lower end portions of the front and rear link members are connected to the pivot shafts. Accordingly, even if a support load of the track frame which supports the travel machine body is great, it is possible to reduce the support loads of the front and rear upper end pivot shafts and the front and rear lower end pivot shafts, and it is possible to easily achieve an enlargement in size of the working vehicle. Further, it is possible to reduce a generation of a malfunction or the like caused by a deformation of each of the pivot shaft portions or the like, and it is possible to improve a load capacity, a durability or the like.

According to the third aspect of the invention, it is further provided with a plurality of rolling wheels which is provided in the track frame and support the ground side of the travel crawler, the front and rear upper end pivot shafts are arranged so as to be divided into the front side and the rear side of the rear axle, and one of the front and rear lower end pivot shafts is arranged in the upper surface side between the plurality of rolling wheels in the upper surface side of the track frame. Accordingly, it is possible to make the support height of the front and rear lower end pivot shafts which are provided in a plurality of rolling wheels. Despite that it is possible to achieve a low cost and a weight saving of the bearing structure of each of the pivot shafts, it is possible to structure the bearing structure of the front and rear lower end pivot shafts advantageously in strength with respect to a ground reaction force of the travel crawler. Further, it is possible to easily secure a length of a boss body of the link member, and it is possible to pivot the boss body of the link member to the pivot shaft by using a bush having a high general purpose property.

According to the fourth aspect of the invention, the rear portion ground side of the travel crawler is supported to the track frame via the driven wheel body, and the other of the front and rear lower end pivot shafts is arranged in the upper surface side of the track frame and between the rolling wheel which is adjacent to the driven wheel body in the plurality of rolling wheels and the driven wheel body. Accordingly, it is possible to make the support height of the front and rear lower end pivot shafts which are provided between the rolling wheel adjacent to the driven wheel body and the driven wheel body low. It is possible to structure the bearing structure of the front and rear lower end pivot shafts advantageously in strength with respect to the ground reaction force of the travel crawler. Further, it is possible to easily secure the length of the boss body of the link member, and it is possible to pivot the boss body of the link member to the pivot shaft by using the bush having a high general purpose property.

According to the fifth aspect of the invention, the front and rear link members are arranged so as to be tapered in a side elevational view of the machine body, and a distance in the upper end side of the front and rear link members is larger than a distance in the lower end side of the front and rear link members. Accordingly, it is possible to reduce a protruding margin of the front and rear link members which are protruded out of the travel crawler toward the travel machine body side, in comparison with the conventional single supporting point structure, and it is possible to easily reduce a generation of such a defect that a muddy soil attached to the front and rear link members interferes with the peripheral constructing parts, at a time when the front and rear link members oscillate.

According to the sixth aspect of the invention, the front and rear upper end pivot shafts are arranged in the vicinity of the drive resultant force line in the forward moving side of the travel crawler, the front side upper end pivot shaft is arranged below the drive resultant force line, and the center of the oscillating locus of the track frame is blow the drive resultant force line. Accordingly, it is possible to support the link member in such a manner that it is not easily displaced with respect to the driving force in the forward moving side of the travel crawler, and it is possible to make the travel crawler follow to a road surface against the rolling reaction force. Therefore, it is possible to reduce a back and forth tilt of the travel machine body at a time of starting or stopping, and it is possible to move the travel machine body in a stable attitude.

According to the seventh aspect of the invention, the front and rear lower end pivot shafts are provided in the track frame within a lateral width of the travel crawler, and each of the lower end sides of the front and rear link members is offset to the track frame side. Accordingly, it is possible to install the lower end pivot shaft or the link member with hardly making the lower end pivot shaft or the link member protrude out of the right and left width of the travel crawler. Therefore, it is possible to support the lower end pivot shaft or the link member, for example, while separating from the linch or high crop plants in a linch straddling work of the working vehicle, and it is possible to secure a sufficient space with respect to the linch or the high crop plants.

BRIEF DESCRIPTION THE OF DRAWINGS

FIG. 1 is a side elevational view of a tractor according to an embodiment of the present invention;
FIG. 2 is a plan view of the same;
FIG. 3 is a side elevational enlarged view of a crawler travel device;
FIG. 4 is a side elevational view of a track frame portion;

DESCRIPTION OF THE PREFERRED EMBODIMENTS

Figure 1:
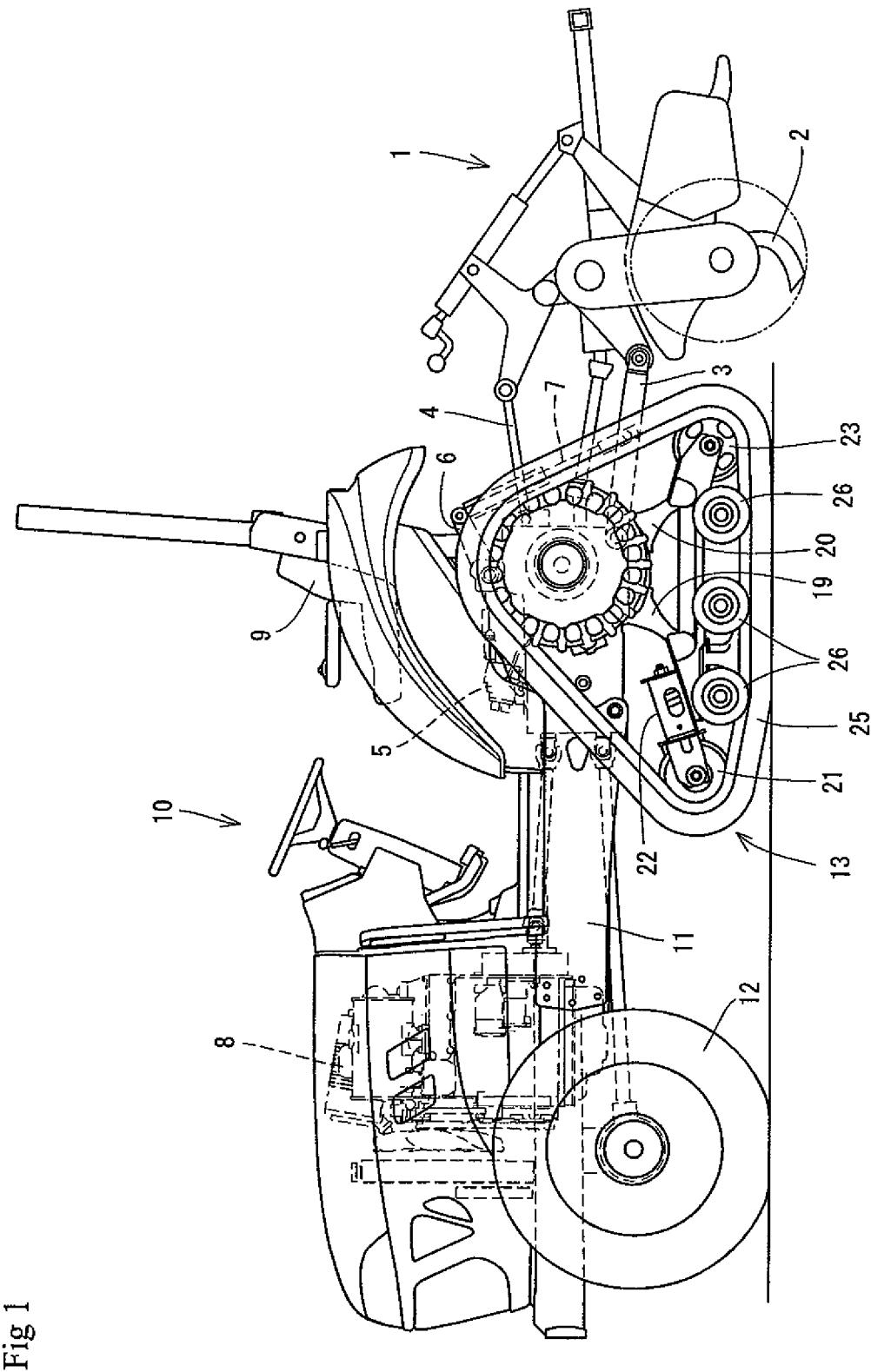

A description will be given below of an embodiment according to the present invention on the basis of the drawings in the case of being applied to a tractor. As shown in FIG. 1 to FIG. 4, reference numeral 10 denotes a tractor in the drawings. The tractor 10 is provided with a travel machine body 11, a pair of right and left front wheels 12 which support a front portion of the travel machine body 11, and a pair of right and left rear crawler travel devices 13 which support a rear portion of the travel machine body 11. The travel machine body 11 mounts an engine 8 thereon and is provided with a control seat 9.

Figure 9:
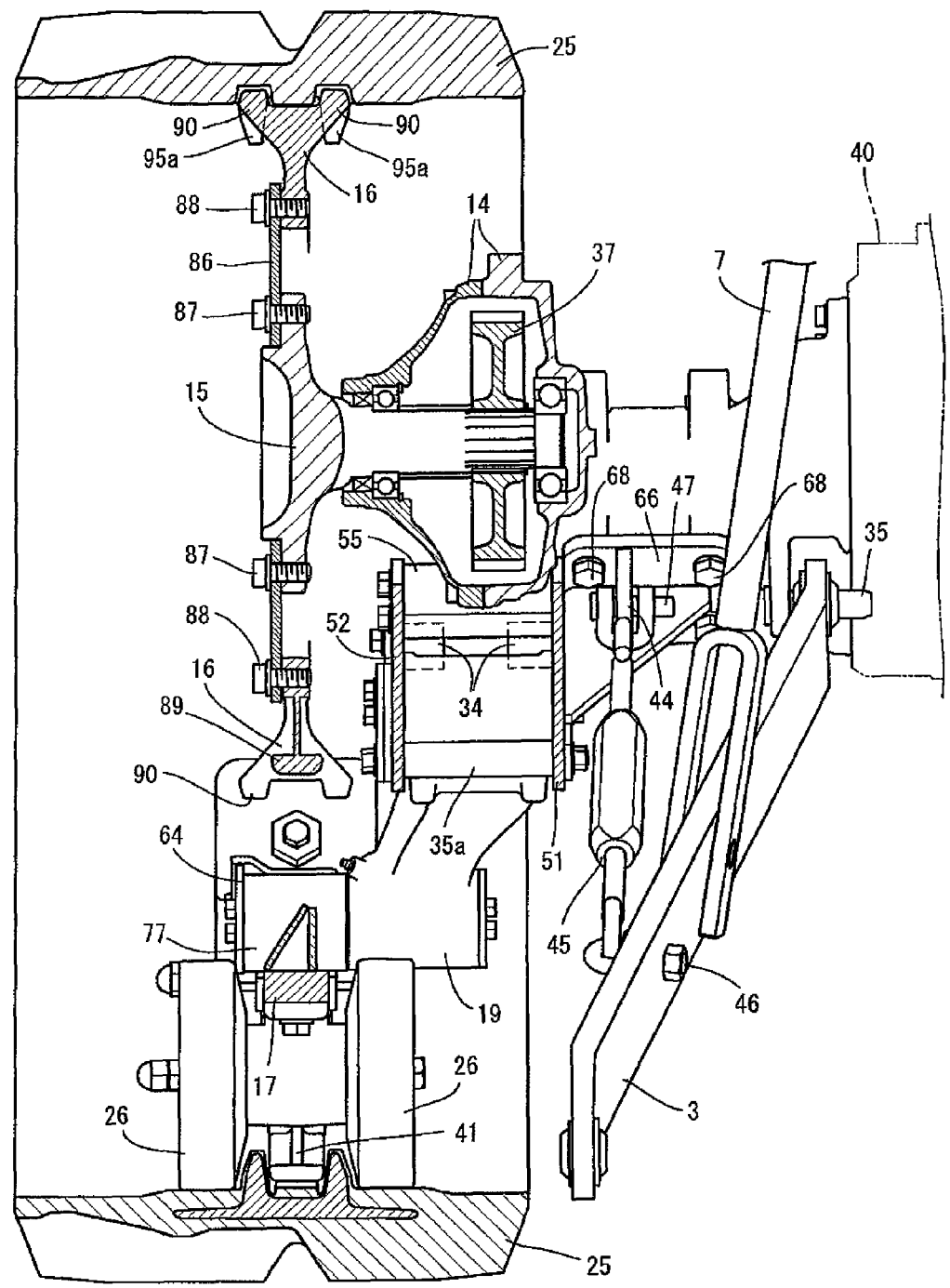
FIG. 9 is a cross sectional explanatory view of the crawler travel device as seen from a rear side.

As shown in FIG. 1 to FIG. 4, a transmission case 40 is mounted on a rear portion of the travel machine body 11. Right and left rear axle cases 14 are provided in both right and left sides of the transmission case 40. A rear crawler travel device 13 is detachably attached to the travel machine body 11 via a rear axle case 14. As shown in FIG. 9, one end side of a rear axle 15 is pivoted within the rear axle case 14, and a final gear 37 for decelerating is pivoted to one end side of the rear axle 15. The other end side of the rear axle 15 is protruded out of the rear axle case 14, and a drive wheel body 16 is attached to the other end side of the rear axle 15. A track frame 17 which extends in a back and forth direction is arranged below the rear axle case 14. A flange member 18 is detachably fastened and fixed to the rear axle case 14. There are provided a front link member 19 which is arranged in a front side of the rear axle 15, and a rear link member 20 which is arranged in a rear side of the rear axle 15. The track frame 17 is connected to the flange member 18 via each of the link members 19 and 20 so as to be movable forward and backward.

As shown in FIG. 1 to FIG. 4, a front driven wheel body 21 is attached to a front end side of the track frame 17 via a tension regulating mechanism 22. A rear driven wheel body 23 is attached to a rear end side of the track frame 17 by a support shaft 24. A travel crawler 25 which serves as a crawler belt and is made of a synthetic rubber is wound like an approximately triangular shape around three elements of the drive wheel body 16, the front driven wheel body 21, and the rear driven wheel body 23. The travel machine body 11 is structured such as to travel forward or travel backward by forward rotating or reverse rotating the drive wheel body 16 (the rear axle 15) at an appropriate speed and driving the travel crawler 25 so as to forward rotate or reserve rotate.

In this case, there are provided a plurality of rolling wheels 26 and a crawler guide body 41. The track frame 17 is provided rotatably with the plurality of rolling wheels 26. The crawler guide body 41 is fastened and fixed to the track frame 17. A plurality of rolling wheels 26 and the crawler guide body 41 are brought into contact with an inner peripheral surface between the front driven wheel body 21 and the rear driven wheel body 23 (an inner peripheral surface in a ground side of the travel crawler 25), in an inner peripheral surface of the travel crawler 25. A ground side of the travel crawler 25 is structured such as to be ground supported by a plurality of rolling wheels 26 and the crawler guide body 41.

Figure 3:
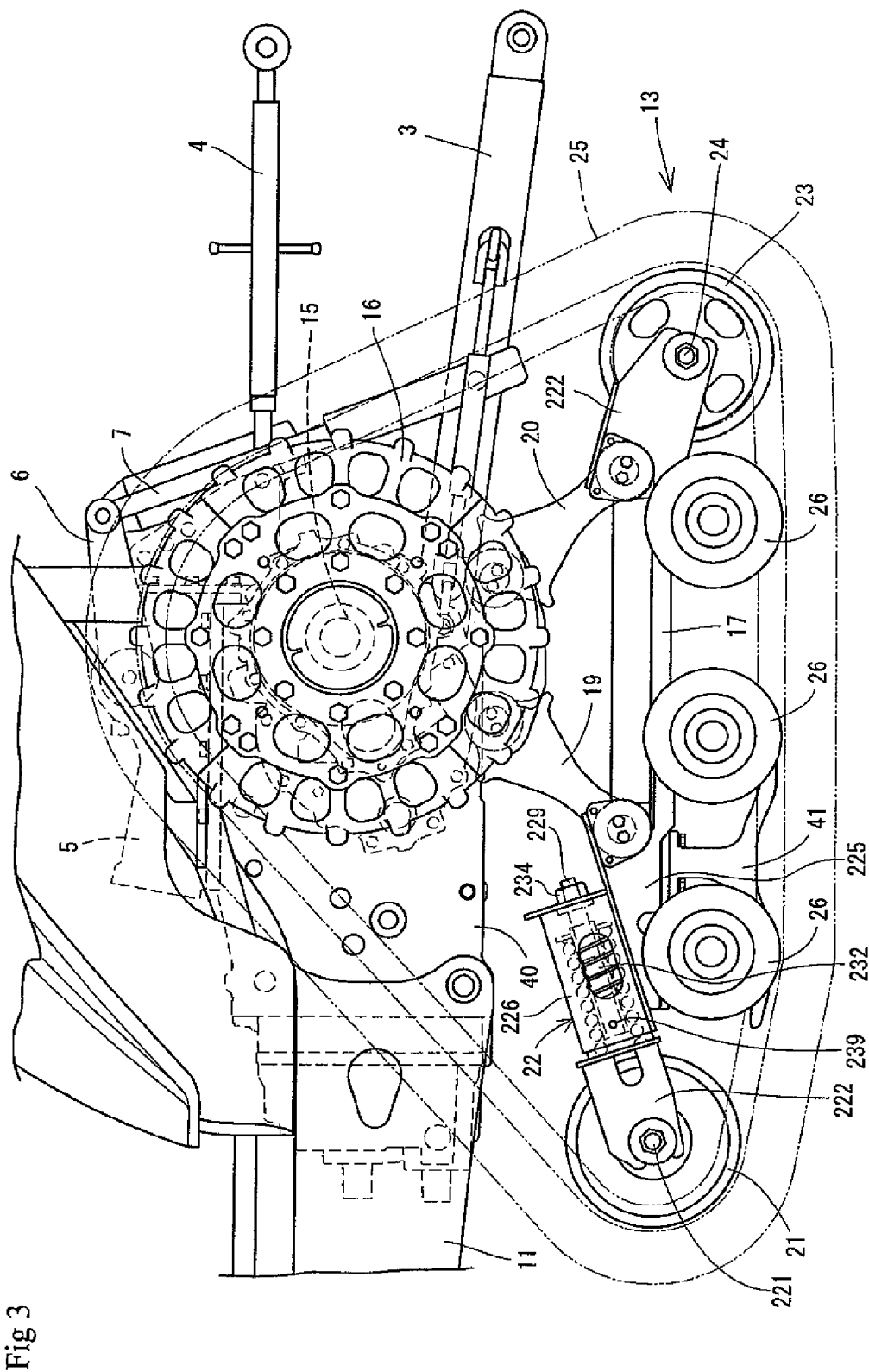
Figure 4:
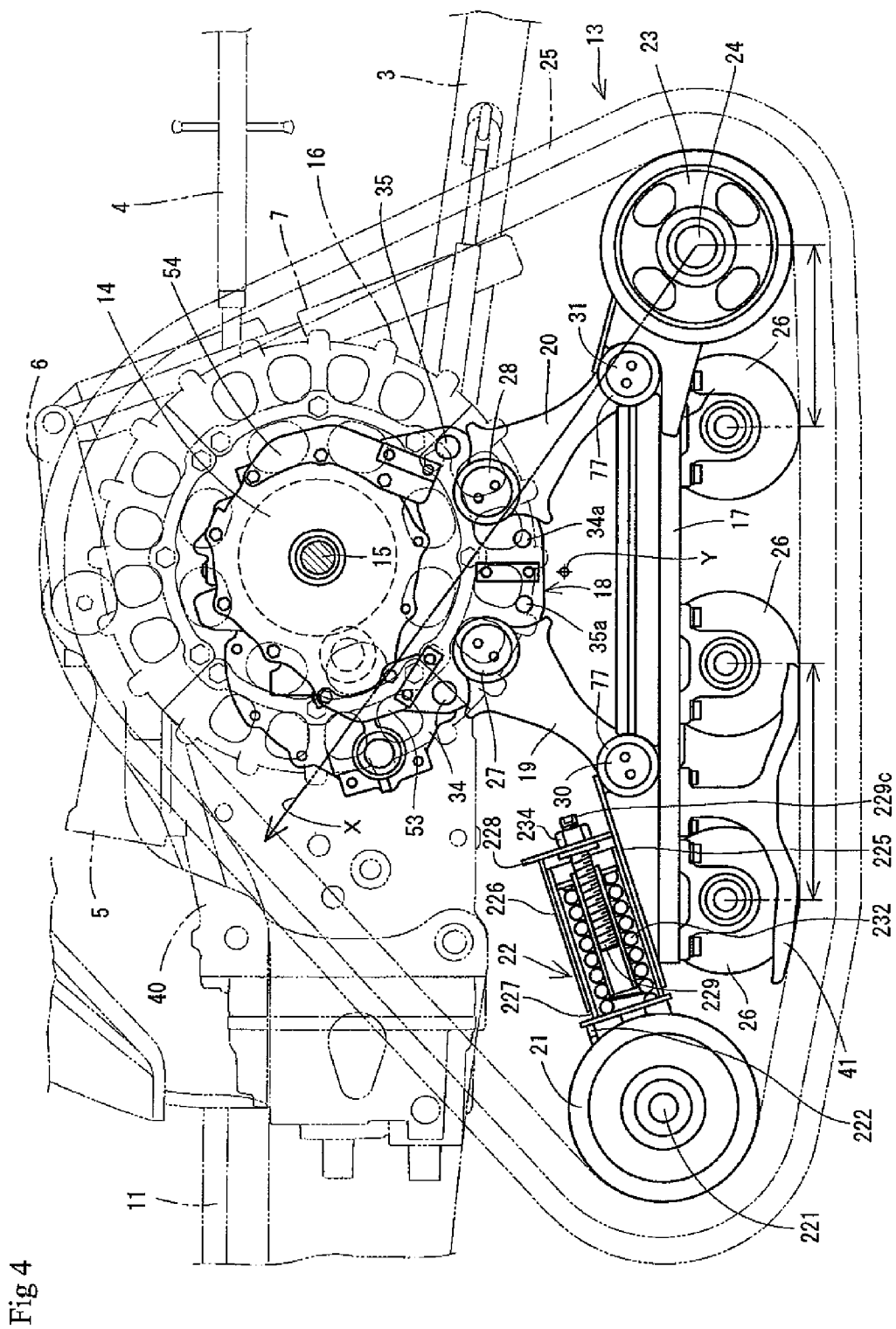
Figure 5:
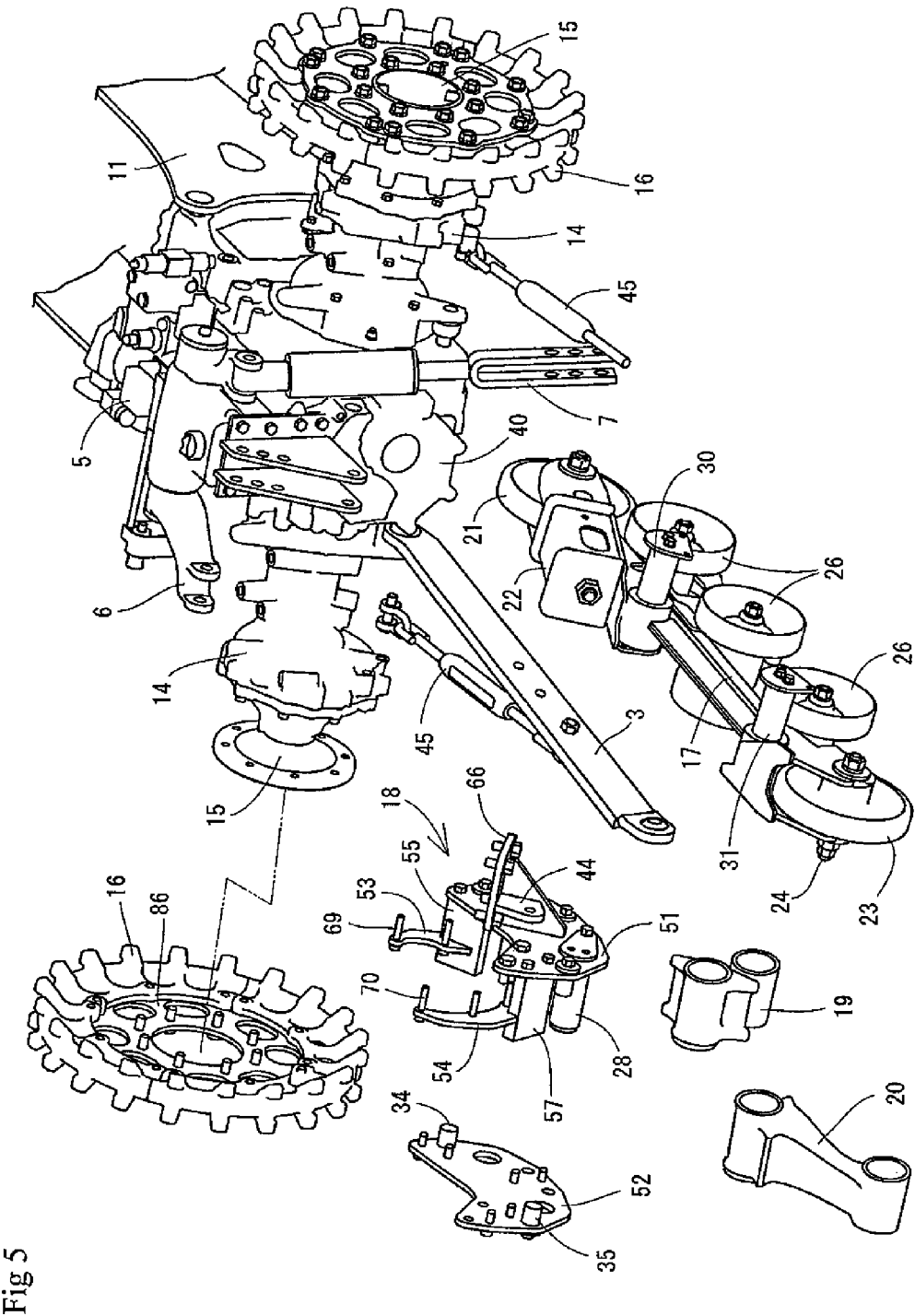
FIG. 5 is an exploded perspective view of the crawler travel device as seen from a right rear side.
Figure 6:
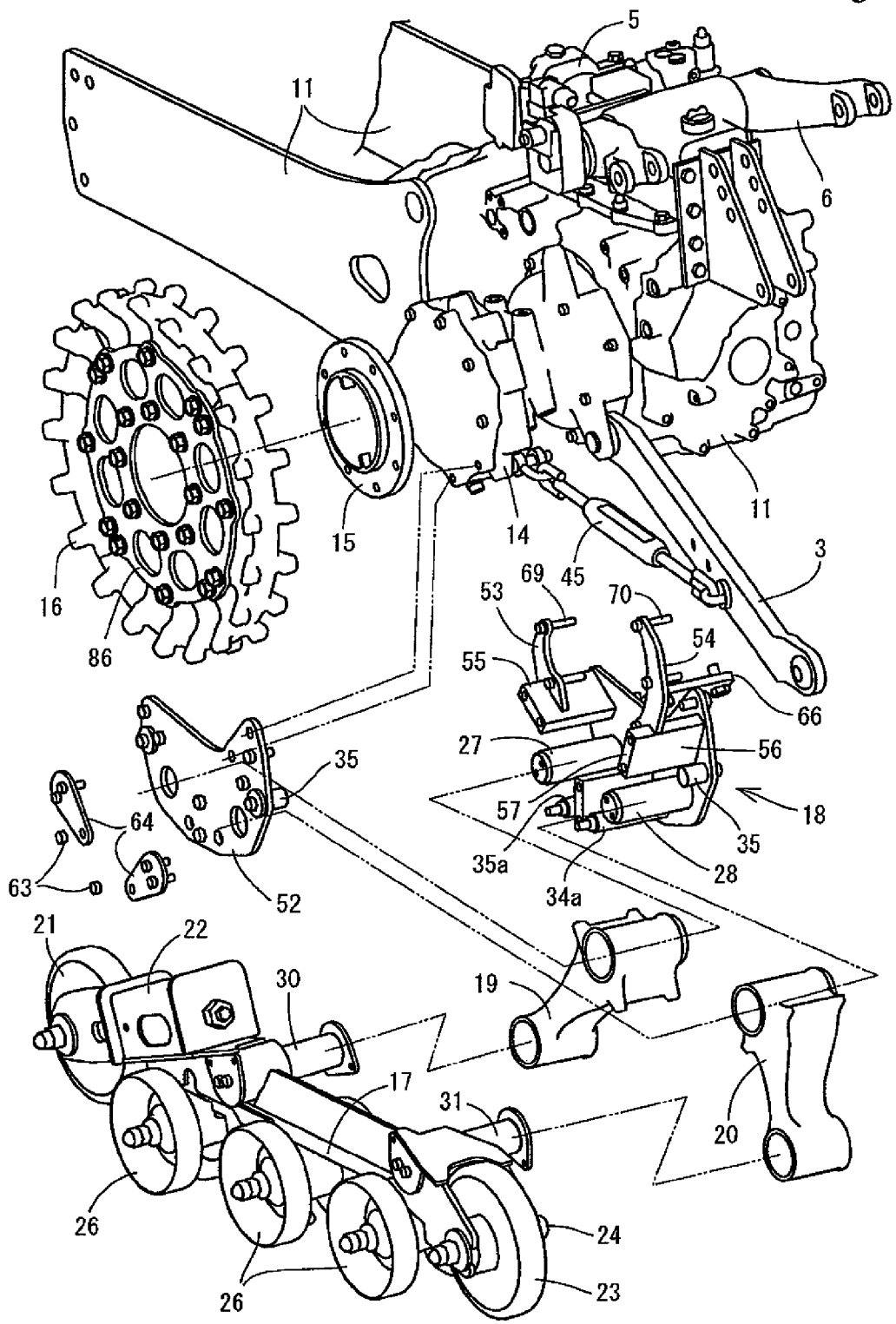
FIG. 6 is an exploded perspective view of the crawler travel device as seen from a left rear side.
Figure 7:
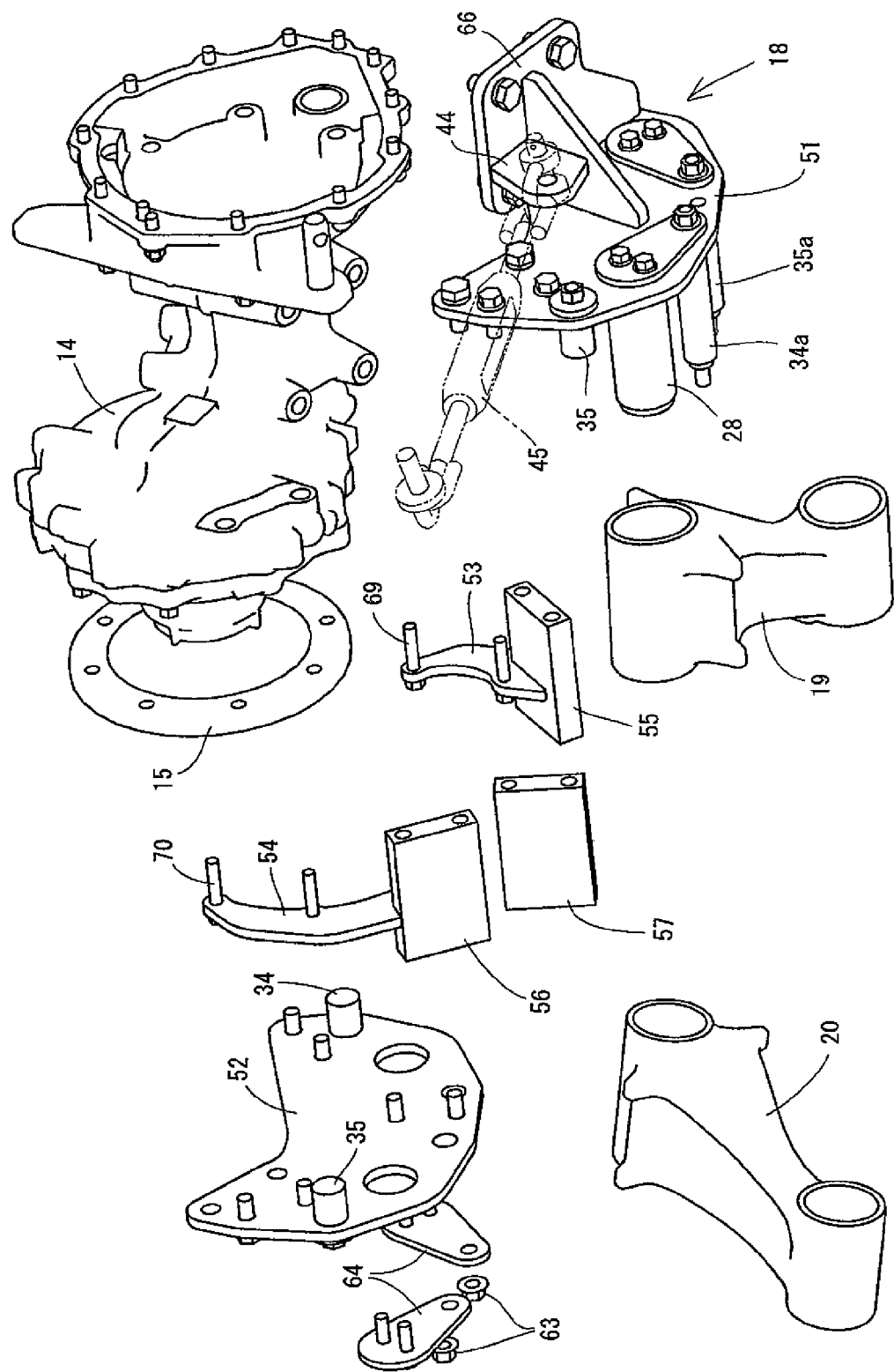
FIG. 7 is an exploded perspective view of a track frame support portion as seen from a right rear side.

As shown in FIG. 3 and FIG. 4, the flange member 18 is provided with front and rear upper end pivot shafts 27, 28. The front and rear upper end pivot shafts 27, 28 are extended in parallel to the rear axle 15. Upper end side boss portions of the front link member 19 and the rear link member 20 are rotatably pivoted to the front and rear upper end pivot shafts 27, 28. The track frame 17 is provided with front and rear lower end pivot shafts 30, 31. The front link member 19 is rotatably connected in its lower end to the track frame 17 by a front lower end pivot shaft 30. The front lower end pivot shaft 30 is positioned in a front side of the front upper end pivot shaft 27, and the front link member 19 is inclined forward so as to be supported.

Further, as shown in FIG. 3 and FIG. 4, the rear link member 20 is rotatably connected in its lower end to the track frame 17 by a rear lower end pivot shaft 31. The rear lower end pivot shaft 31 is positioned in a rear side of the rear upper end pivot shaft 28, and the rear link member 20 is inclined rearward so as to be supported. Thus, the front and rear link members 19, 20 are arranged in a tapered shape which is widened downward with each other in a side elevational view (FIG. 3 and FIG. 4) in the tractor 10. In this case, the travel crawler 25 is provided in a tension manner as an approximately triangular shape in which a distance from a vertical line passing through the rear axle 15 to the front driven wheel body 21 is larger than a distance from the vertical line to the rear driven wheel body 23, in a side elevational view (FIG. 3 and FIG. 4) in the tractor 10.

With the structure mentioned above, in the case of making the tractor 10 travel forward, the travel crawler 25 is exposed to a forward moving reaction force from a ground surface, whereby the track frame 17 moves in a forward direction with respect to the travel machine body 11, and the travel crawler 25 is inclined to a forward rising attitude. In other words, when the track frame 17 moves in a forward direction with respect to the travel machine body 11, the front link member 19 rotates in a collapsing direction in such a manner that an angle of incline from a horizontal surface becomes smaller by using the upper end pivot shaft 27 as a supporting point. Further, the rear link member 20 rotates in a rising direction in such a manner that the angle of incline from the horizontal surface becomes larger by using the upper end pivot shaft 28 as a supporting point. As a result, the travel crawler 25 is inclined upward to the front side, and moves forward.

On the other hand, in the case of making the tractor 10 travel backward, the track frame 17 moves in a backward direction with respect to the travel machine body 11 by being exposed to a backward moving reaction force from a ground surface, whereby the travel crawler 25 is inclined in a forward down attitude. In other words, when the track frame 17 moves in a backward direction with respect to the travel machine body 11, the front link member 19 rotates in a rising direction in such a manner that the angle of incline from the horizontal surface becomes larger by using the upper end pivot shaft 27 as a supporting point. Further, the rear link member 20 rotates in a collapsing direction in such a manner that the angle of incline from the horizontal surface becomes smaller by using the upper end pivot shaft 28 as a supporting point. As a result, the travel crawler 25 is inclined downward to a front side, and moves backward.

In the case of interrupting the drive of the travel crawler 25 in an inner side of a swivel so as to swivel and move in a left direction or a right direction, the travel crawler 25 in the inner side of the swivel is inclined downward to the front side at a time of traveling forward, and the travel crawler 25 in the inner side of the swivel is inclined upward to the front side at a time of traveling backward.

The flange member 18 is provided with front and rear regulation pins 34, 34*a*, 35, and 35*a* which serve as a stopper for regulating a forward rotation of the front link member 19 by using the front upper end pivot shaft 27 as a supporting point, and a rearward rotation of the rear link member 20 by using the rear upper end pivot shaft 28 as a supporting point. A range in which a lower end of the front link member 19 (the rear link member 20) rotates forward by using the upper end pivot shaft 27 as a supporting point is set by the front regulation pin 34 (the front regulation pin 34*a*). A range in which a lower end of the rear link member 20 (the front link member 19) rotates backward by using the upper end pivot shaft 28 as a supporting point is set by the rear regulation pin 35 (the rear regulation pin 35*a*). A forward and backward movement of the travel crawler 25 with respect to the travel machine body 11 is structured such as to be limited by the front and rear regulation pins 34, 34*a*, 35, and 35*a*.

Further, in the case of carrying out a pitching (a forward tilting motion) in such a manner that the front portion of the travel machine body 11 comes down, the front link member 19 rotates in a collapsing direction in such a manner that the angle of incline from the horizontal surface becomes smaller by using the lower end pivot shaft 30 as a supporting point. On the other hand, the rear link member 20 rotates in a rising direction in such a manner that the angle of incline from the horizontal surface becomes larger by using the lower end pivot shaft 31 as a supporting point, with respect to the track frame 17. Accordingly, the travel crawler 25 is supported in a forward rising attitude with respect to the travel machine body 11.

Further, in the case of carrying out a pitching (a rearward tilting motion) in such a manner that the front portion of the travel machine body 11 comes up, the front link member 19 rotates in a rising direction in such a manner that the angle of incline from the horizontal surface becomes larger by using the lower end pivot shaft 30 as a supporting point. On the other hand, the rear link member 20 rotates in a collapsing direction in such a manner that the angle of incline from the horizontal surface becomes smaller by using the lower end pivot shaft 31 as a supporting point. Accordingly, the travel crawler 25 is supported in a forward down attitude with respect to the travel machine body 11.

In this case, in a four-bar link mechanism which is constructed by the flange member 18, the front link member 19, the rear link member 20, and the track frame 17, an "instance center" at a time when the track frame 17 which is one bar thereof makes a movement in a longitudinal direction thereof is positioned in an intersecting point at which an extension of the front link member 19 intersects an extension of the rear link member 20. The track frame 17 makes a movement in a longitudinal direction around the "instant center".

In this case, since the front and rear link members 19, 20 are arranged in the tapered shape which is widened downward, the instant center moves to a rear side of the machine body at a time when the travel machine body 11 pitches downward to the front side, and moves to a front side of the machine body at a time when the travel machine body 11 pitches upward to the front side, and it is possible to hold the instant center at a height position which is similar to a height of the rear axle 15. Accordingly, it is possible to widely reduce a distance at which the travel machine body 11 moves forward and backward with respect to the track frame 17 at a time when the travel machine body 11 pitches, in comparison with the forward and backward moving distance of the prior art.

Figure 2:
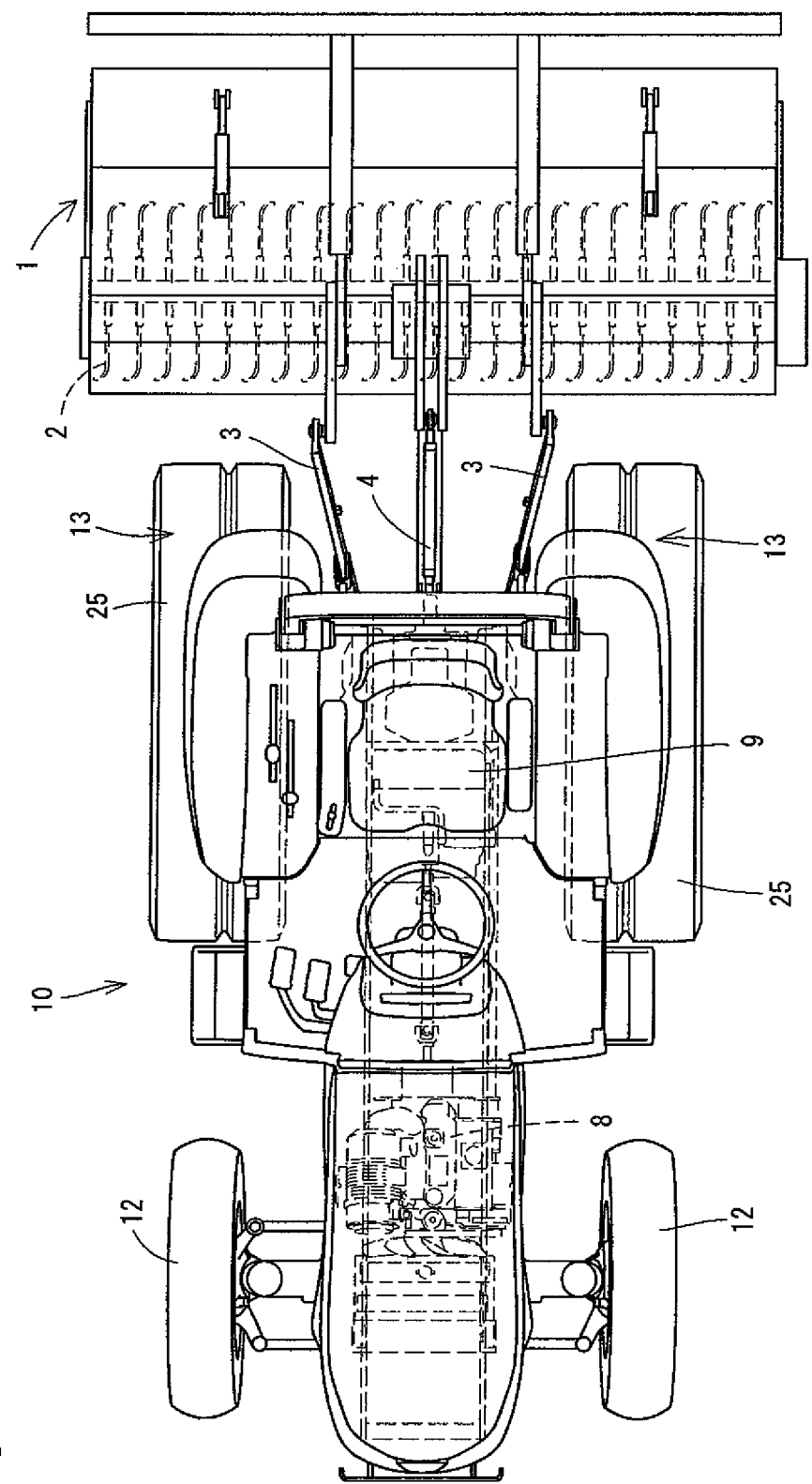

Further, as shown in FIG. 1 and FIG. 2, there is provided a rotary tiller working machine 1 having a rotary tillage tine 2. A lower link 3 and a top link 4 (a three-point link mechanism) are protruded out of a rear portion of the travel machine body 11 to a rear side, and the rotary tiller working machine 1 is installed to the lower link 3 and the top link 4. A hydraulic lift mechanism 5 is provided in a rear portion of the travel machine body 11 (an upper portion of the transmission case 40). A back and forth intermediate portion of the lower link 3 is connected to a lift arm 6 of the hydraulic lift mechanism 5 via a lift rod 7. The tractor 10 is structured such that the rotary tiller working machine 1 is moved up and down on the basis of an operation of the hydraulic lift mechanism 5, the rotary tillage tine 2 cultivates a soil in a farm field. In this case, needless to say, various working machines can be installed to the tractor 10, in place of the rotary tiller working machine 1.

Figure 8:
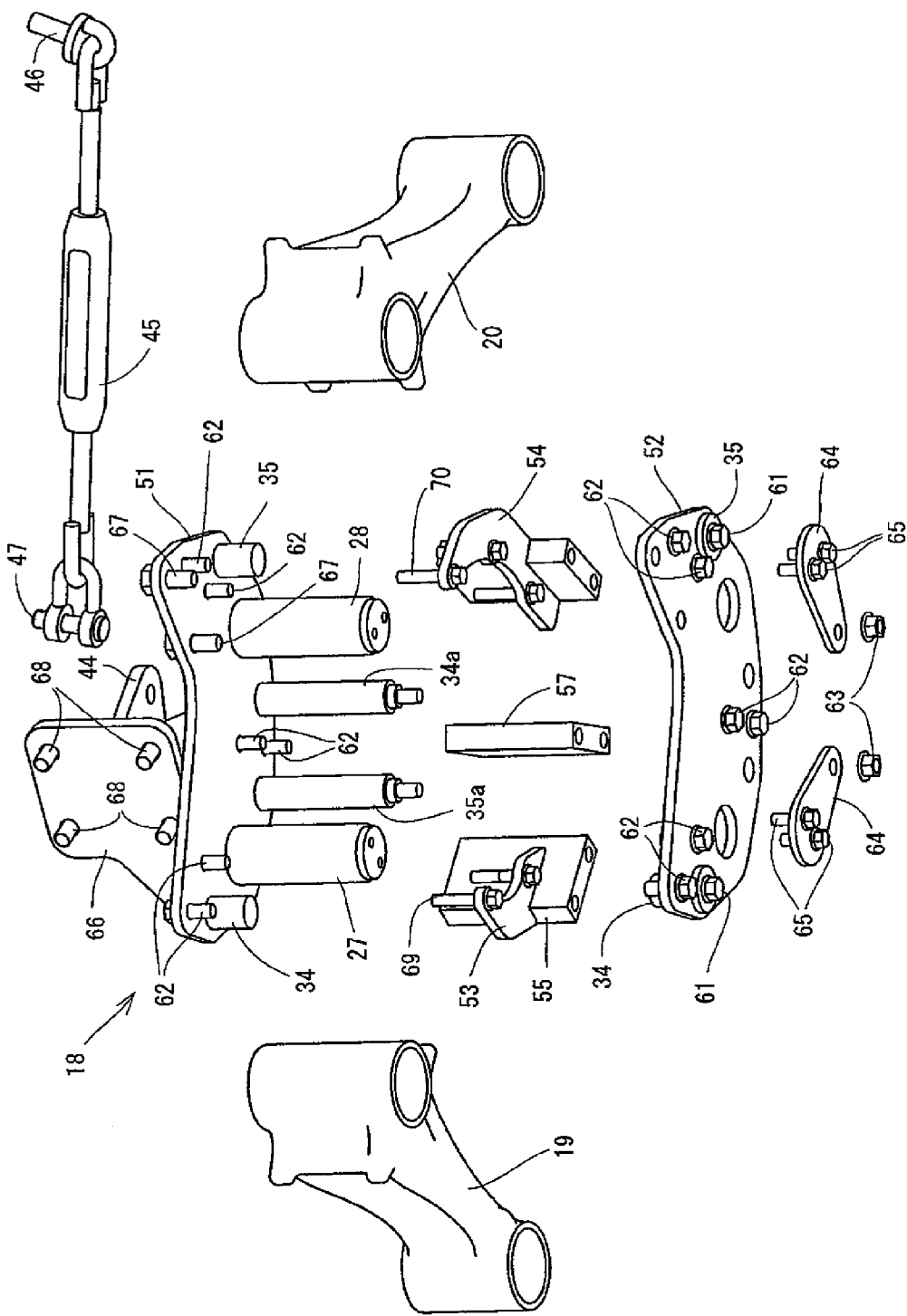
FIG. 8 is an exploded perspective view of the track frame support portion as seen from a left rear side.
Figure 10:
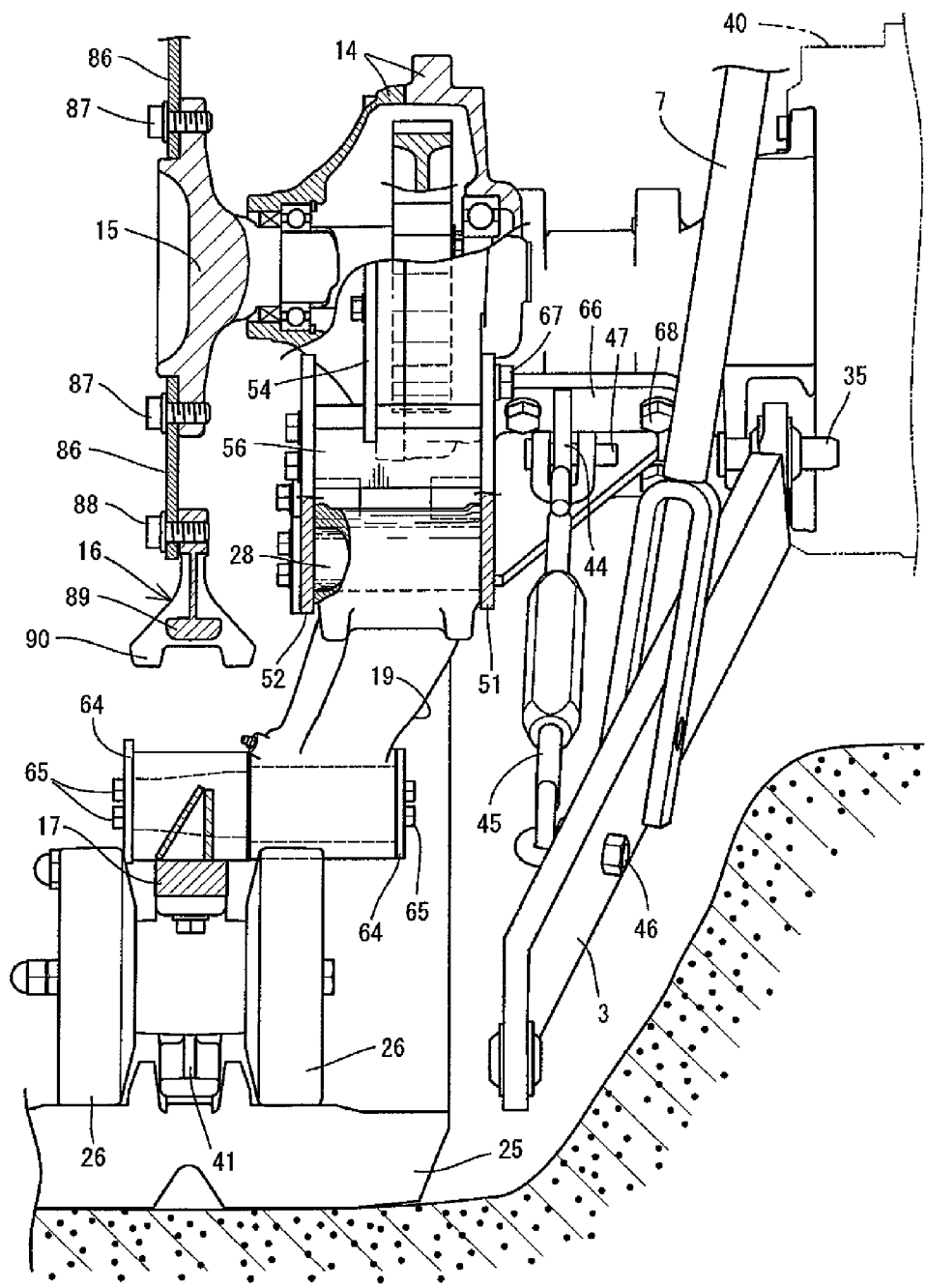
FIG. 10 is a cross sectional explanatory view of the track frame support portion as seen from a rear side.

Next, a description will be given of an attaching structure of the track frame 17, the link members 19, 20, and the flange member 18, with reference to FIG. 5 to FIG. 10. As shown in FIG. 8 to FIG. 10, the flange member 18 has a first bracket body 51 which is made of a steel plate and is formed as a tabular shape, a second bracket body 52 which is made of a steel plate and is formed as a tabular shape, front and rear third bracket bodies 53, 54 which are made of a steel plate and are formed as a tabular shape, and front, rear, and middle transversely bar shaped bracket bodies 55, 56, 57 which are made of a steel plate and are formed as a tabular shape. The first bracket body 51 and the second bracket body 52 are formed as the same shape. The front and rear transversely bar shaped bracket bodies 55, 56 are respectively fixed by welding to the front and rear third bracket bodies 53, 54.

Further, two front and rear regulation pins 34, 35 in a larger diameter side are fastened in one end side to the first bracket body 51 and the second bracket body 52 in a cantilever manner by a bolt 61. The regulation pins 34, 35 are protruded in another end side to opposed surfaces of the first bracket body 51 and the second bracket body 52. Further, both end surfaces of the front, rear, and middle transversely bar shaped bracket bodies 55, 56, 57 are fastened to the first bracket body 51 and the second bracket body 52 in an inboard manner by a bolt 62. Further, both end screw portions of two front and rear regulation pins 34a, 35a in a small diameter side are fastened to the first bracket body 51 and the second bracket body 52 in an inboard manner by a nut 63.

Further, in a state in which the front and rear upper end pivot shafts 27, 28 are passed through the upper end side boss portions of the front and rear link members 19, 20, both end portions of the front and rear upper end pivot shafts 27, 28 are fastened to the first bracket body 51 and the second bracket body 52 via a shaft pressing plate body 64 in an inboard manner by a bolt 65. In this case, the shaft pressing plate body 64 is fastened by the nut 63, thereby preventing a rotation of the shaft pressing plate body 64 around an axis.

On the other hand, a seat plate body 66 is fixed by welding to the first bracket body 51. The first bracket body 51 and the seat plate body 66 are fastened by bolts 67, 68 to the rear axle case 14. Further, the third front and rear bracket bodies 53 and 54 are fastened by bolts 69 and 70 to the rear axle case 14. The rear axle case 14 is firmly fixed detachably in a pinching manner between the first bracket body 51, and the third bracket bodies 53, 54. In an assembling work, the second bracket body 52 is firmly fixed to the first bracket body 51, thereby constructing a unit in a state in which the front and rear link members 19, 20 are provided in the flange member 18. Thereafter, the flange member 18 of the unit construction is brought into contact with a bottom surface side of the rear axle case 14 from the below side of the rear axle case 14, and the first bracket body 51, the seat plate body 66, and the third bracket bodies 53, 54 are fastened by the bolts 67, 68, 69, 70, thereby structuring such that the front and rear link members 19 and 20 are assembled in the rear axle case 14 via the flange member 18.

Further, a vibration stop bracket 44 is fixed by welding to the seat plate body 66. In order to prevent the tiller working machine 1 (the right and left lower links 3) from oscillating right and left too much, in a state of allowing the oscillation somewhat in a right and left direction, right and left turnbuckle type sway chain bodies 45 are provided as a stabilizer. One end side of the sway chain body 45 is connected by a pin 46 to an intermediate of a longitudinal width of the lower link 3, and the other end side of the sway chain body 45 is detachably connected by a pin 47 to the vibration stop bracket body 44.

Figure 11:
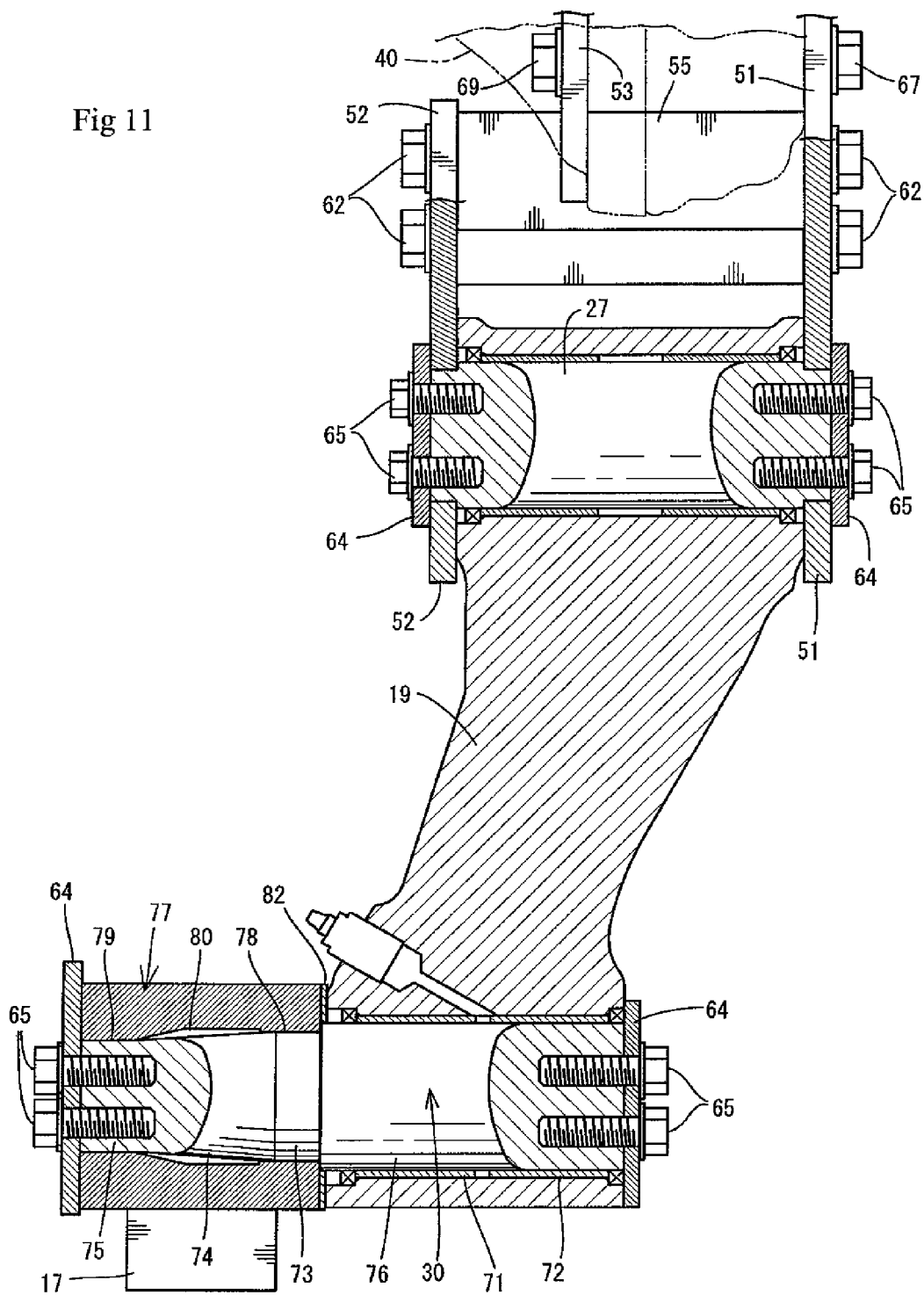
FIG. 11 is an enlarged cross sectional view of the track frame support portion.
Figure 12:
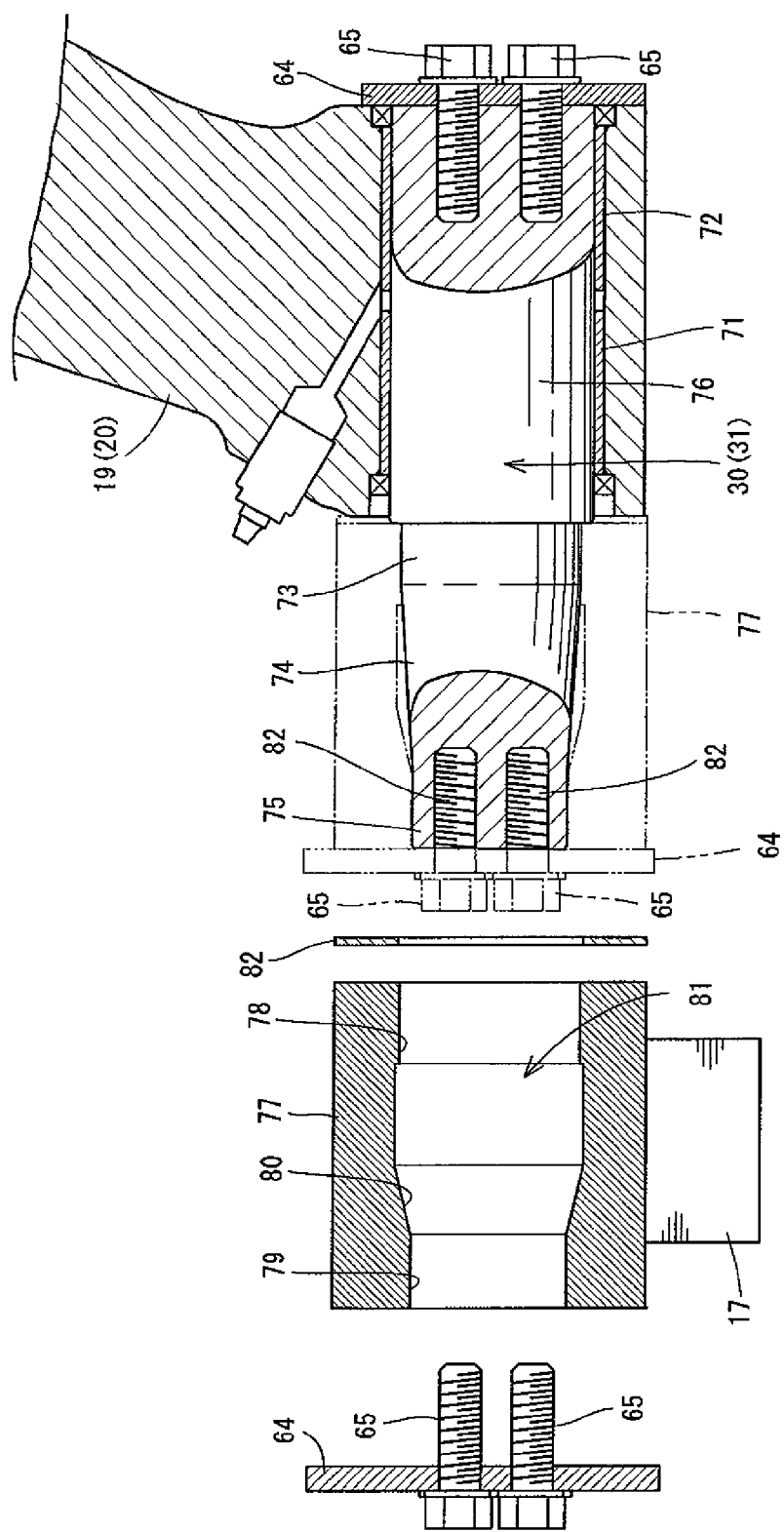
FIG. 12 is an exploded explanatory view of FIG. 11.

Next, a description will be given of a connecting structure of the track frame 17 and the link members 19, 20 with reference to FIG. 4, and FIG. 9 to FIG. 13. As shown in FIG. 11 and FIG. 12, a machine body inner shaft portion 76 in one end side of the lower end pivot shafts 30 and 31 is rotatably pivoted to a lower end side boss portion of the link members 19, 20 via bearing metals 71, 72. A large diameter shaft portion 73, a taper portion 74 having a tapered shape, and a small diameter shaft portion 75 are provided in the other end side (a machine body outer side) of the lower end pivot shafts 30, 31 which are protruded out of the lower end side boss portion of the link members 19, 20 toward a machine body outer side. The small diameter shaft portion 75 is connected to the large diameter shaft portion 73 via the taper portion 74. A bolt hole 76 is provided in an end surface in the other end side of the lower end pivot shafts 30, 31. In this case, in comparison with an outer diameter of the large diameter shaft portion 73, an outer diameter of the machine body inner shaft portion 76 is made larger.

As shown in FIG. 11 and FIG. 12, a bearing tube body 77 is fixed by welding to an upper surface of a track frame 17 which is long in a back and forth direction and is formed as a square pole. A shaft hole 81 of the bearing tube hole 77 is formed by a large diameter hole 78 in which the large diameter shaft portion 73 of the lower end pivot shafts 30, 31 are inserted, a small diameter hole 79 in which the small diameter shaft portion 75 of the lower end pivot shafts 30, 31 are inserted, and a taper hole 80 which communicates the large diameter hole 78 with the small diameter hole 79. Further, it is structured such that a thrust washer 82 is fitted to the other end side (a machine body outer side) of the lower end pivot shafts 30, 31, and the bearing tube body 77 is fitted thereto.

In the structure mentioned above, the other end side of the lower end pivot shafts 30, 31 which are protruded out of the lower end side boss portion of the link members 19, 29 is inserted into the shaft hole 81 from the large diameter hole 78 side, at the forefront of the small diameter shaft portion 75. The shaft pressing plate body 64 is brought into contact with an end surface of the bearing tube body 77 in the small diameter hole 79 side, a leading end of the bolt 65 is inserted into the small diameter hole 79, the bolt 65 is engaged with the bolt hole 76 in the end surfaces of the lower end pivot shafts 30, 31, the small diameter shaft portion 75 is pressed into the small diameter hole 79, the large diameter shaft portion 73 is pressed into the large diameter hole 78, and the other end side of the lower end pivot shafts 30, 31 is firmly fixed to the bearing tube body 77 in the upper surface of the track frame 17.

As shown in FIG. 1, FIG. 4, and FIG. 9 to FIG. 13, in the working vehicle provided with the travel machine body 11 which mounts the engine 8 thereon, the right and left front wheels 12 which are provided in the lower side of the front portion of the travel machine body 11, the track frame 17 which is provided in the lower side of the rear portion of the travel machine body 11, and the right and left travel crawlers 25 which are installed to the track frame 17, and structured such that the rear axle 15 which transmits the rotating force to the travel crawler 25 is provided so as to be spaced from the front and rear upper end pivot shafts 27, 28 as the oscillation supporting axis which support the track frame 17 to the travel machine body 11 so as to freely oscillate, the front and rear upper end pivot shafts 27, 28 are arranged just below the rear axle case 14 which serves as the axle case to which the rear axle 15 is pivoted, and the track frame 17 is connected to the rear axle case 14 via the front link member 19 and the rear link member 20 which are provided in the front and rear upper end pivot shafts 27 and 28. Accordingly, for example, in the case of climbing over the convex portion such as the linch of the farm field at a time of moving forward or at a time of moving backward, an angle of incline in the back and forth direction of the ground surface of the travel crawler 25 becomes smaller than the conventional one even if the travel crawler 25 is inclined upward to the front side or downward to the front side around the front and rear upper end pivot shafts 27, 28. In other words, the ground height of the travel machine body 11 is hard to change in comparison with the conventional one, and it is possible to maintain a ride quality of the operator boarding on the control seat 9 in a good state.

As shown in FIG. 4, and FIG. 9 to FIG. 13, the oscillation supporting point shaft is formed by the front and rear upper end pivot shafts 27, 28 and the front and rear lower end pivot shafts 30, 31, the rear axle case 14 is provided with the front and rear upper end pivot shafts 27, 28, the track frame 17 is provided with the front and rear lower end pivot shafts 30, 31, and the upper and lower end portions of the front and rear link members 20, 21 are connected to the pivot shafts 27, 28, 30, 31. Accordingly, even if the support load to the travel machine body 11 of the track frame 17 is great, it is possible to reduce a support load of each of the front and rear upper end pivot shafts 27, 28 and the front and rear lower end pivot shafts 30, 31, and it is possible to easily achieve an enlargement in size of the working vehicle. Further, it is possible to reduce a generation of a malfunction caused by a deformation of each of the pivot shafts 27, 28, 30, 31 or the like, and it is possible to improve a load capacity and a durability.

As shown in FIG. 9 to FIG. 13, the machine inner surface and the machine outer side of the rear axle case 14 are provided with the first bracket body 51 which serves as the machine inner supporting point body and the second bracket body 52 which serves as the machine outer supporting point body, the front and rear upper end pivot shafts 27, 28 are pinched between the first bracket body 51 and the second bracket body 52, and the front and rear upper end pivot shafts 27, 28 or the front and rear link members 19, 20 are arranged in the machine outer side than the constructing part (the sway chain body 45) of the lower link 3 which serves as the link mechanism for supporting the tiller working machine 1 to the travel machine body 11. Therefore, in spite that it is possible to move up and down the lower link 3 without being limited by the rear upper end pivot shafts 27, 28 or the rear link members 19, 20, it is possible to easily improve a support rigidity of the upper end pivot shafts 27, 28. Further, it is possible to simplify the support structure of the upper end pivot shafts 27, 28, and it is possible to reduce a manufacturing cost.

As shown in FIG. 10, the front and rear lower end pivot shafts 30, 31 are provided in the track frame 17 within a lateral width of the travel crawler 25, and the lower end sides of the front and rear link members 19 and 20 are structured such as to be offset to the track frame 17 side. Accordingly, it is possible to install the lower end pivot shafts 30, 31 or the link members 19, 20 with hardly making the lower end pivot shafts 30, 31 or the link members 19, 20 protrude out of the lateral width of the travel crawler 25. Therefore, it is possible to support the front and rear lower end pivot shafts 30, 31 or the front and rear link members 19, 20, for example, so as to be spaced from a ridge G or a high crop plant in ridge striding work of the tractor 10, and it is possible to secure a sufficient space with respect to the ridge G or the high crop plant.

As shown in FIG. 1, FIG. 4, and FIG. 11, in the working vehicle provided with the travel machine body 11 which mounts the engine 8 thereon, the right and left front wheels 12 which are provided in the lower side of the front portion of the travel machine body 11, the track frame 17 which is provided in the lower side of the rear portion of the travel machine body 11, the right and left travel crawlers 25 which are installed to the track frame 17, the rear axle 15 which transmits the rotating force to the travel crawler 25, and a plurality of rolling wheels 26 which is provided in the track frame 17, and supports the ground side of the travel crawler 25 via the plurality of rolling wheels 26, two link members 19, 20 are connected between the front upper end pivot shaft 27, the rear upper end pivot shaft 28 which are provided just below the rear axle 15 and serve as two upper pivot shafts, and the front lower end pivot shaft 30, the rear lower end pivot shaft 31 which are provided in the track frame 17 and serve as two lower pivot shafts, the front upper end pivot shaft 27 and the rear upper end pivot shaft 28 which are two upper ones are arranged in a divided manner in the front side and the rear side of the rear axle 15, and one of the front lower end pivot shaft 30 and the rear lower end pivot shaft 31 which are two lower ones is arranged in the upper surface side between the plurality of rolling wheels 26 in the upper surface side of the track frame 17. Therefore, it is possible to make the support height of the front lower end pivot shaft 30 which is provided between the plurality of rolling wheels 26 low. In spite that it is possible to achieve a low cost or a weight saving of the bearing structure of the upper and lower front upper end pivot shaft 27 and the front lower end pivot shaft 30, it is possible to structure the bearing structure of the front lower end pivot shaft 30 advantageously in strength, with respect to the ground reaction force of the travel crawler 25. Further, it is possible to easily secure a length of the boss body of the link member 19, and it is possible to pivot the boss body of the front link member 19 to the front lower end pivot shaft 30 by using the bush having a high general purpose property.

As shown in FIG. 4 and FIG. 11, in a structure which supports the rear ground side of the travel crawler 25 to the track frame 17 via the rear driven wheel body 23, the other of two front lower end pivot shaft 30 and rear lower end pivot shaft 31 is arranged in the upper surface side of the track frame 17 between the rolling wheel 26 which is adjacent to the rear driven wheel body 23, and the rear driven wheel body 23. Accordingly, it is possible to make the support height of the rear lower end pivot shaft 31 which is provided between the rolling wheel 26 adjacent to the rear driven wheel body 23 and the rear driven wheel body 23 low. It is possible to structure the bearing structure of the rear lower end pivot shaft 31 advantageously in strength with respect to the ground reaction force of the travel crawler 25. Further, it is possible to easily secure the boss body length of the link members 19, 20, and it is possible to pivot the boss body of the rear link member 20 to the rear lower end pivot shaft 31 by using the bush having a high general purpose property.

As shown in FIG. 4, two link members 19, 20 are arranged in the tapers shape in a side elevational view of the machine body, and it is structured such that a distance in a lower end side of two link members 19 and 20 becomes larger than a distance in an upper end side of two link members 19, 20. Accordingly, it is possible to reduce a protruding margin of two link members 19, 20 which are protruded out of the travel crawler 25 toward the travel machine body 11 side, in comparison with the conventional single supporting point structure, and it is possible to easily reduce a generation of such a defect that the muddy soil attached to two link members 19, 20 interferes with the peripheral constructing part or the like, at a time when two links 19, 20 members oscillate.

As shown in FIG. 4 and FIG. 11, the front upper end pivot shaft 27 and the rear upper end pivot shaft 28 are arranged in the vicinity of the drive resultant force line X in the forward moving side of the travel crawler 25, the upper pivot shaft 27 in the machine body front side is arranged below the drive resultant force line X, and it is structured such that a center Y of an oscillating locus of the track frame 17 is below the drive resultant force line X. Accordingly, it is possible to support the link members 19, 20 in such a manner that they do not easily displace with respect to the driving force in the forward moving side of the travel crawler 25, to make the travel crawler 25 follow to the road surface against the rolling reaction force, to reduce a forward and backward tilting motion of the travel machine body 11 at a time of starting or stopping, and it is possible to move the travel machine body 11 in a stable attitude.

As shown in FIG. 11 and FIG. 12, the front lower end pivot shaft 30 and the rear lower end pivot shaft are formed as a two-stage stepped shaft shape, and it is structured such that a two-stage stepped shaft portion of the front lower end pivot shaft 30 and the rear lower end pivot shaft (the large diameter shaft portion 73 of the lower end pivot shaft, and the small diameter shaft portion 75 of the lower end pivot shaft) are pressed into the bearing tube body 77 which is provided in the track frame 17 and serves as the lower bearing body, by fasting the bolt 65. Therefore, it is possible to improve an assembling workability of the front lower end pivot shaft 30 and the rear lower end pivot shaft by guiding action of a tapered portion which is obtained by forming the leading end side of the front lower end pivot shaft 30 and the rear lower end pivot shaft in the tapered shape. For example, it is not necessary to assemble the front lower end pivot shaft 30 and the rear lower end pivot shaft by a knocking or a pressing. Further, it is possible to maintain the shaft strength of the front lower end pivot shaft 30 and the rear lower end pivot shaft by crimping the two-stage step portions of the front lower end pivot shaft 30 and the rear lower end pivot shaft respectively to the boss body inner holes of the link members 19 and 20.

Next, a description will be given of a connecting structure between the track frame 17 and the link members 19, 20 with reference to FIGS. 14 to FIG. 19. As shown in FIG. 14 to FIG. 17, an inner hole edge side of a donut-shaped rim body 86 made of a sheet metal is fastened by a bolt 87 to a discoid attaching portion 15a in an end portion of the rear axle 15 which is protruded outward from the rear axle case 14. An inner hole edge side of a donut-shaped drive wheel body 16 is fastened by a bolt 88 to an outer peripheral edge side of the rim body 86. The drive wheel body 16 has an annular sprocket gear tooth bottom portion 89, and a pair of bifurcated sprocket gear tooth bodies 90 which are protruded out of both sides of the sprocket gear tooth bottom portion 89 in a radial direction. Plural sets of sprocket gear tooth bodies 90 are provided at even intervals in all the regions of the pulley ring portion 89. In other words, the sprocket gear tooth bottom portion 89 is formed in an endless manner in all the outer peripheral surface of the drive wheel body 16, and a pair of bifurcated sprocket gear tooth bodies 90 protrude out of both side edges of the sprocket gear tooth bottom portion 89 outward radially, so that the plural sets of sprocket gear tooth bodies 90 are arranged at even intervals in all the outer peripheral surface of the drive wheel body 16.

Further, the donut-shaped drive wheel body 16 made of an iron alloy is formed so as to be divided into four partial ring bodies 16a. One partial ring body 16a is formed at a magnitude which is one fourth the same circumference. Four partial ring bodies 16a are connected as a ring shape by confronting the end surfaces 16b in the radial direction, and four partial ring bodies 16a are arranged in the same circumference, thereby forming the drive wheel body 16. Four partial ring bodies 16a are independently attached to and detached from the rim body 86, thereby structuring such that any one of four partial ring bodies 16a can be replaced. In other words, since four partial ring bodies 16a can be independently treated in an assembling work or the like, it is possible to weight save the single part (one partial ring body 16a) so as to easily carry and assemble.

Figure 15:
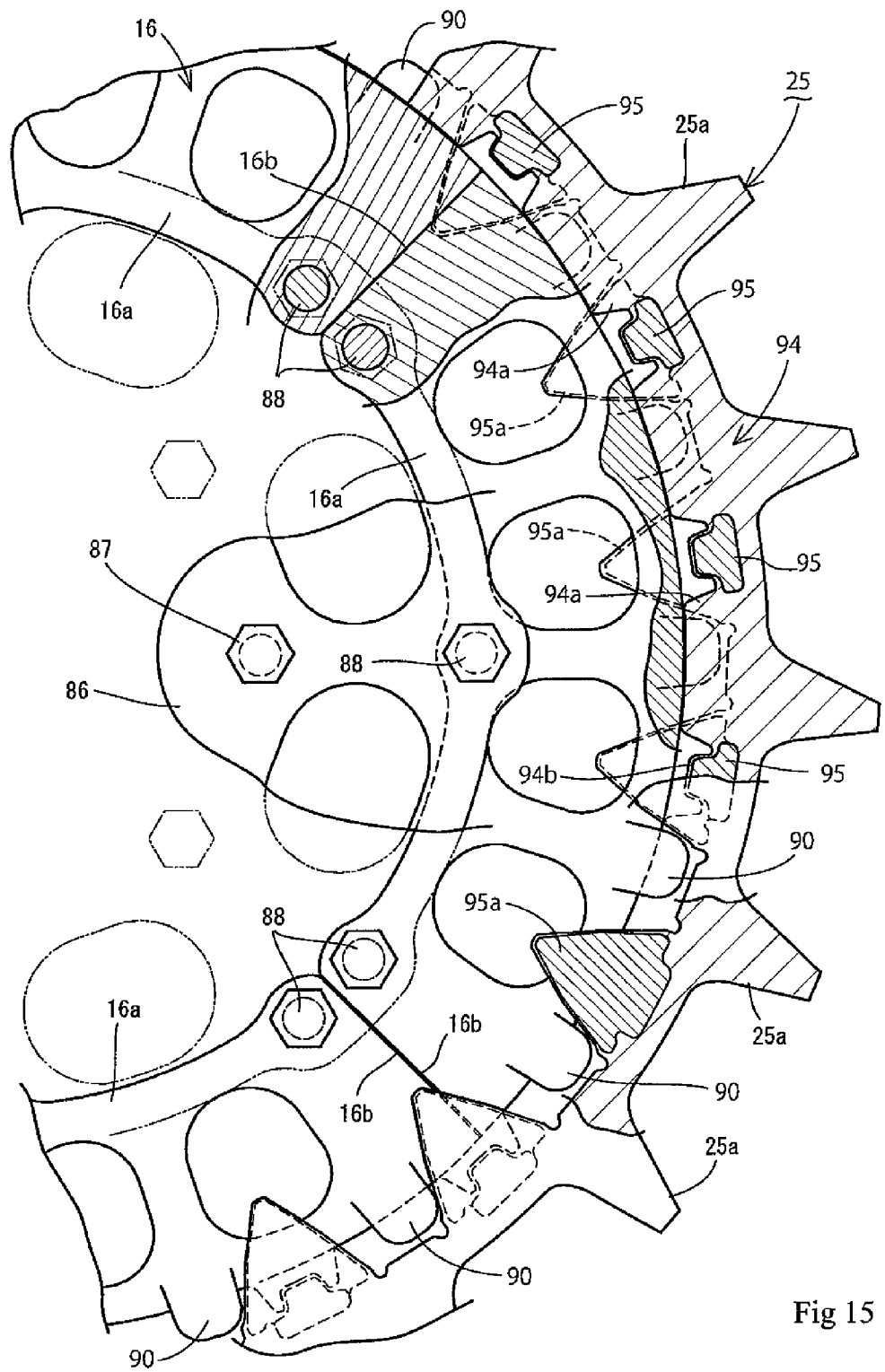
FIG. 15 is a partly enlarged explanatory view of the drive wheel body portion.
Figure 16:
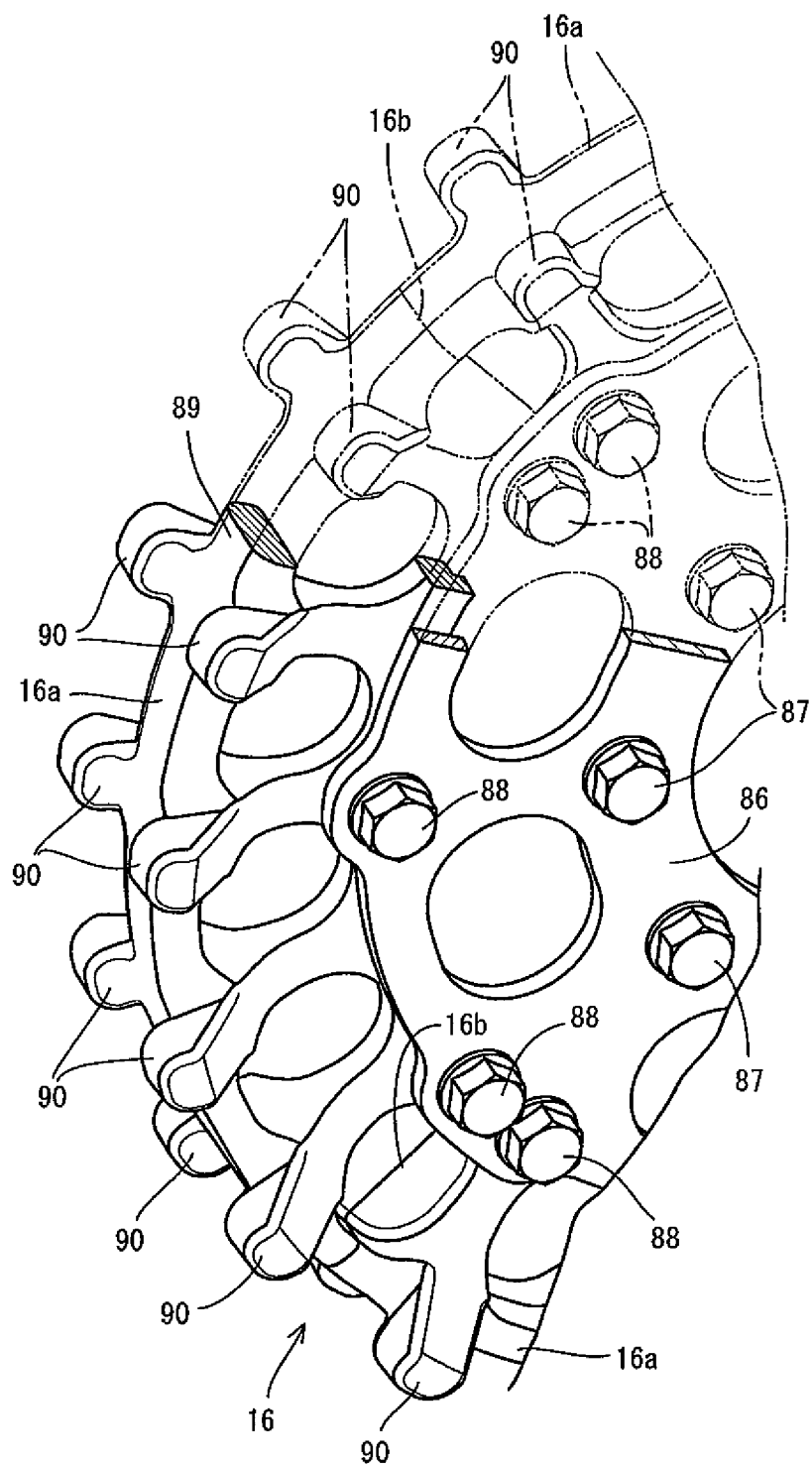
FIG. 16 is a partly perspective view of the drive wheel body portion.
Figure 18:
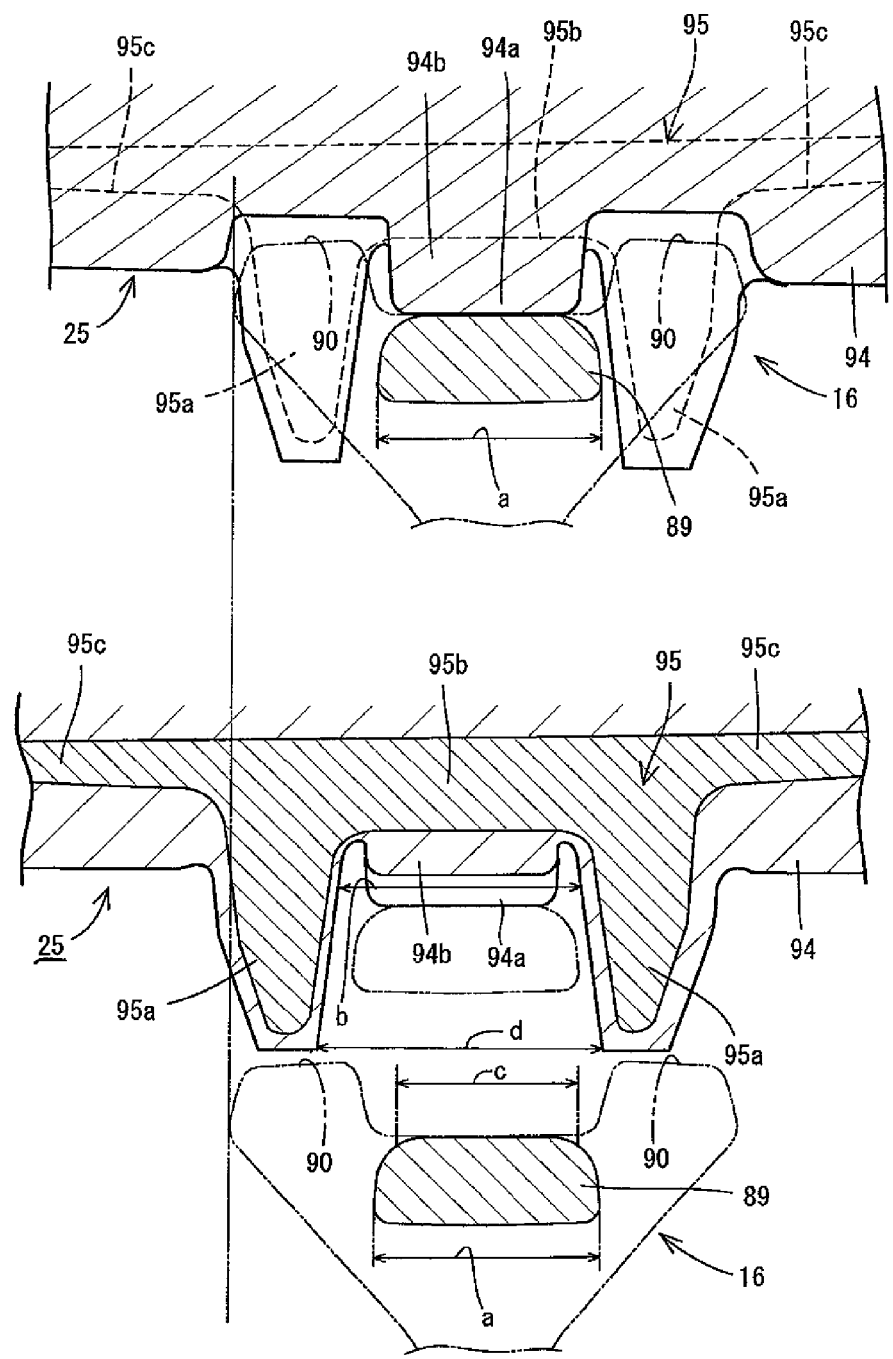
FIG. 18 is a partly enlarged explanatory view of a travel crawler and the drive wheel body portion.

Further, as shown in FIG. 15 and FIG. 18, the endless band-shaped travel crawler 25 is constructed by a crawler main body 94 which forms a lot of lags 25a in an outer peripheral surface side and is made of a synthetic rubber, and a plurality of cored bar bodies 95 which is embedded at even intervals in the crawler main body 94. The cored bar body 95 has a pair of cored bar claw portions 95a which engage the sprocket gear tooth body 90, a cored bar body portion 95b which connects each of the cored bar claw portion 95a, and right and left vane piece portions 95c which are extended in a right and left direction from both end sides of the cored bar body portion 95b. Plural sets of cored bar claw portions 95a are provided in a protruding manner at even intervals in all the regions in an inner peripheral surface side of the crawler main body 94. In this case, a whole of the cored bar body 95 (including the cored bar claw portion 95a) is coated by the synthetic rubber which corresponds to a constructing material of the crawler main body 94.

A flat belt-shaped contact convex portion 94a is integrally formed in an inner peripheral surface between the cored bar claw portions 95a which are adjacent in an extending direction of the endless band, in the inner peripheral surface of the crawler main body 94. A plurality of contact convex portions 94a is provided in a protruding manner at even intervals in all the regions in the inner peripheral surface side of the crawler main body 94. In this case, an inner peripheral convex surface portion 94b which connects the contact convex portions 94a is formed between them. A height of the inner peripheral convex surface portion 94b is formed lower than a height of the contact convex portion 94a which protrudes to the inner peripheral side of the travel crawler 25. It is possible to prevent a side displacement of the travel crawler 25 on the basis of a contact between the inner surfaces of the pair of cored bar claw portions 95a and the contact convex portion 94a or the inner peripheral convex surface portion 94b. Further, on the basis of the connection of the inner peripheral convex surface portion 94b, it is possible to form the rubber layer in the inner peripheral surface of the travel crawler 25 thick, the contact convex portion 94a can be reinforced, and it is possible to prevent the inner peripheral side of the travel crawler 25 (the rubber layer such as the contact convex portion 94a) from peeling off.

In other words, as shown in FIG. 15, in the case that the travel crawler 25 is wound around the drive wheel body 16, the contact convex portion 94a is brought into pressure contact with the sprocket gear tooth bottom portion 89 which is formed as a pulley shape on the basis of the rubber contact, and a low torque rotating force of the drive wheel body 16 is transmitted to the travel crawler 25 side on the basis of a friction between the sprocket gear tooth bottom portion 89 and the contact convex portion 94a. It is possible to reduce a driving noise on the basis of the rubber contact. Further, the sprocket gear tooth body 90 is fitted between the cored bar claw portions 95a which are adjacent in the extending direction of the endless band, the sprocket gear tooth body 90 comes into contact with the cored bar claw portion 95a on the basis of a metal contact, and a high torque rotating force of the drive wheel body 16 is transmitted to the travel crawler 25 side on the basis of an engagement between the sprocket gear tooth body 90 and the cored bar claw portion 95a. It is possible to reduce a drive loss on the basis of the metal contact, and it is possible to prevent a gear jump (an idle running) or the like from being generated.

Further, as shown in FIG. 18, a cross sectional end surface shape of the sprocket gear tooth bottom portion 89 of the drive wheel body 16 is formed as a trapezoidal shape. It is structured such that a difference (d–c) between a trapezoidal outer peripheral side width c of the sprocket gear tooth bottom portion 89 and a leading end side inner width d of the pawl portion 95a of the cored bar body 95 is larger than a difference (b–a) between a trapezoidal inner peripheral side width a of the sprocket gear tooth bottom portion 89 and a root side inner width b of the claw portion 95a of the cored bar body 95.

In this case, a difference (d–c) between the trapezoidal outer peripheral side width c of the sprocket gear tooth bottom portion 89 and the leading end side inner width d of the pawl portion 95a of the cored bar body 95 is formed largest, a difference (d–a) between the trapezoidal inner peripheral side width a of the sprocket gear tooth bottom portion 89 and the leading end side inner width d of the pawl portion 95a of the cored bar body 95 is formed smaller than the difference (d–c), and a difference (b–a) between the trapezoidal inner peripheral side width a of the sprocket gear tooth bottom portion 89 and the root side inner width b of the pawl portion 95a of the cored bar body 95 is formed further smaller.

As shown in FIG. 1, FIG. 14 to FIG. 16, and FIG. 18, in the working vehicle provided with the travel machine body 11 which mounts the engine 8 thereon, the track frame 17 which is provided in the lower side of the travel machine body 11, and the right and left travel crawlers 25 which are installed to the track frame 17 via the drive wheel body 16 and the driven wheel bodies 21, 23, and structured such that the travel crawler 25 is provided with a plurality of cored bar bodies 95 which are engaged with the drive wheel body 16, the contact convex portion 94a which serves as a rubber belt body is provided in a center portion of a lateral width in the travel crawler 25, and it is structured such that the sprocket gear tooth bottom portion 89 which serves as the annular portion of the drive wheel body 16 and the annular portion of the driven wheel bodies 21, 23 come into contact with the contact concave portion 94a, thereby rotating the travel crawler 25. Accordingly, the rotating fore of the drive wheel body 16 is transmitted to the travel crawler 25 on the basis of the friction drive of the sprocket gear tooth bottom portion 89 of the drive wheel body 16 and the contact convex portion 94a. On the other hand, at a time of a heavy load, the rotating force of the drive wheel body 16 is transmitted to the travel crawler 25 on the basis of the metal contact between the cored bar body 95 and the tooth body (the sprocket gear tooth body 90) of the drive wheel body 16. In other words, in spite that it is possible to reduce the driving noise at a time of a light load, it is possible to reduce a drive loss caused by a deflection or the like, and it is possible to prevent the gear jump at a time of the heavy load. Further, the drive wheel bodies 21, 23 normally roll on the contact convex portion 94a, and it is possible to reduce a metal contact sound which is generated from the drive wheel body 94a portion.

As shown in FIG. 15 and FIG. 18, the contact convex portion 94a which serves as the rubber belt body is provided in the center portion of the lateral width in the travel crawler 25, the contact convex portion 94a is integrally formed in the inner peripheral surface of the travel crawler 25, and it is structured such that the sprocket gear tooth bottom portion 89 which serves as the annular portion of the drive wheel body 16 and the outer peripheral surface which serves as the annular portion of the driven wheel bodies 21, 23 rotate on the contact convex portion 94a. Accordingly, at a time of the light load, on the basis of the friction drive of the sprocket gear tooth bottom portion 89 of the drive wheel body 16 and the contact convex portion 94a, the rotating force of the drive wheel body 16 is transmitted to the travel crawler 25. In other words, it is possible to reduce the driving noise at a time of the light load. It is possible to prevent the abrasion of the drive wheel body 16 or the cored bar body 95. On the other hand, at a time of the heavy load, the rotating force of the drive wheel body 16 is transmitted to the travel crawler 25 on the basis of the metal contact between the cored bar body 95 and the tooth of the drive wheel body 16. In other words, it is possible to reduce a drive loss caused by a deflection or a permanent set of the travel crawler 25. It is possible to prevent the gear jump of the drive wheel body 16. Further, the driven wheel bodies 21, 23 normally roll on the contact convex portion 94a, whereby it is possible to reduce the metal contact sound which is generated from the driven wheel bodies 21, 23.

As shown in FIG. 15 and FIG. 18, it is structured such that the right and left sprocket gear tooth bodies 90 are protruded to both sides of the outer peripheral portion in the drive wheel body 16, the sprocket gear tooth bottom portion 89 is formed between the right and left sprocket gear tooth bodies 90, the cored bar body 95 is brought into metal contact with the right and left sprocket gear tooth bodies 90, and the contact convex portion 94a is brought into contact with the inner surfaces of the right and left sprocket gear tooth bodies 90 and the sprocket gear tooth bottom portion 89. Accordingly, even when a side slip force acts on the travel crawler 25, it is possible to easily prevent the travel crawler 25 from being disconnected from the drive wheel body 16 on the basis of the contact between the inner surfaces of the right and left sprocket gear tooth bodies 90 and the contact convex portion 94a. It is possible to form the friction surface between the sprocket gear tooth bottom portion 89 and the contact convex portion 94a wide on the basis of the contact between the sprocket gear tooth bottom portion 89 which is formed in a whole of the outer periphery of the drive wheel body 16 and the contact convex portion 94a of the travel crawler 25, and to lower a contact surface pressure between the sprocket gear tooth bottom portion 89 and the contact convex portion 94a, and thereby to suppress an abrasion of the sprocket gear tooth bottom portion 89 or the contact convex portion 94a.

As shown in FIG. 15 and FIG. 18, the end surface of the sprocket gear tooth bottom portion 89 of the drive wheel body 16 is formed as a trapezoidal shape, and it is structured such that the difference (c–d) between the trapezoidal outer peripheral side width c of the sprocket tooth bottom portion 89 and the inner width d in the claw portion leading end side of the cored bar body becomes larger than the difference (a–b) between the trapezoidal inner peripheral side width a of the sprocket gear tooth bottom portion 89 and the inner width b in the claw portion root side of the cored bar body 95. Therefore, even when the side slip force acts on the travel crawler 25, it is possible to easily prevent the travel crawler 25 from being disconnected from the drive wheel body 16.

Figure 17:
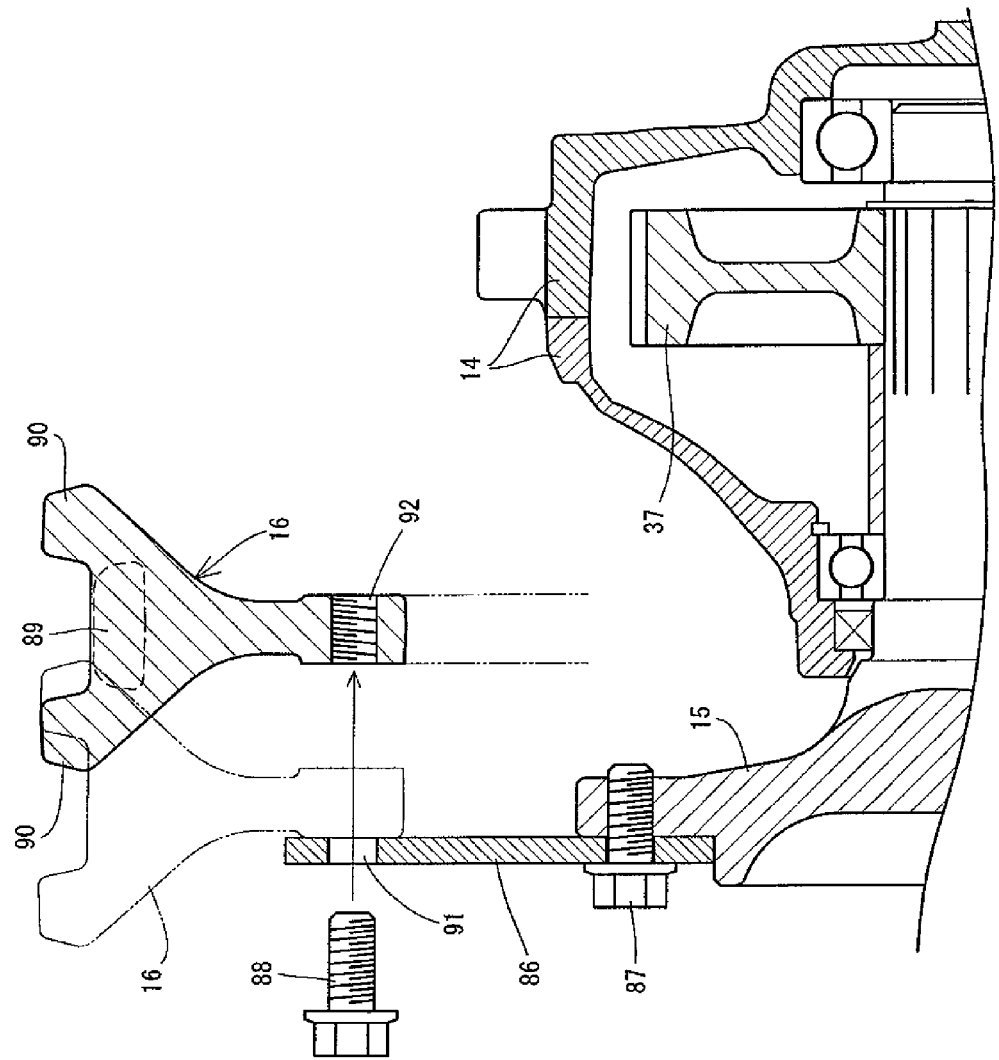
FIG. 17 is an exploded explanatory view of the drive wheel body portion.
Figure 19:
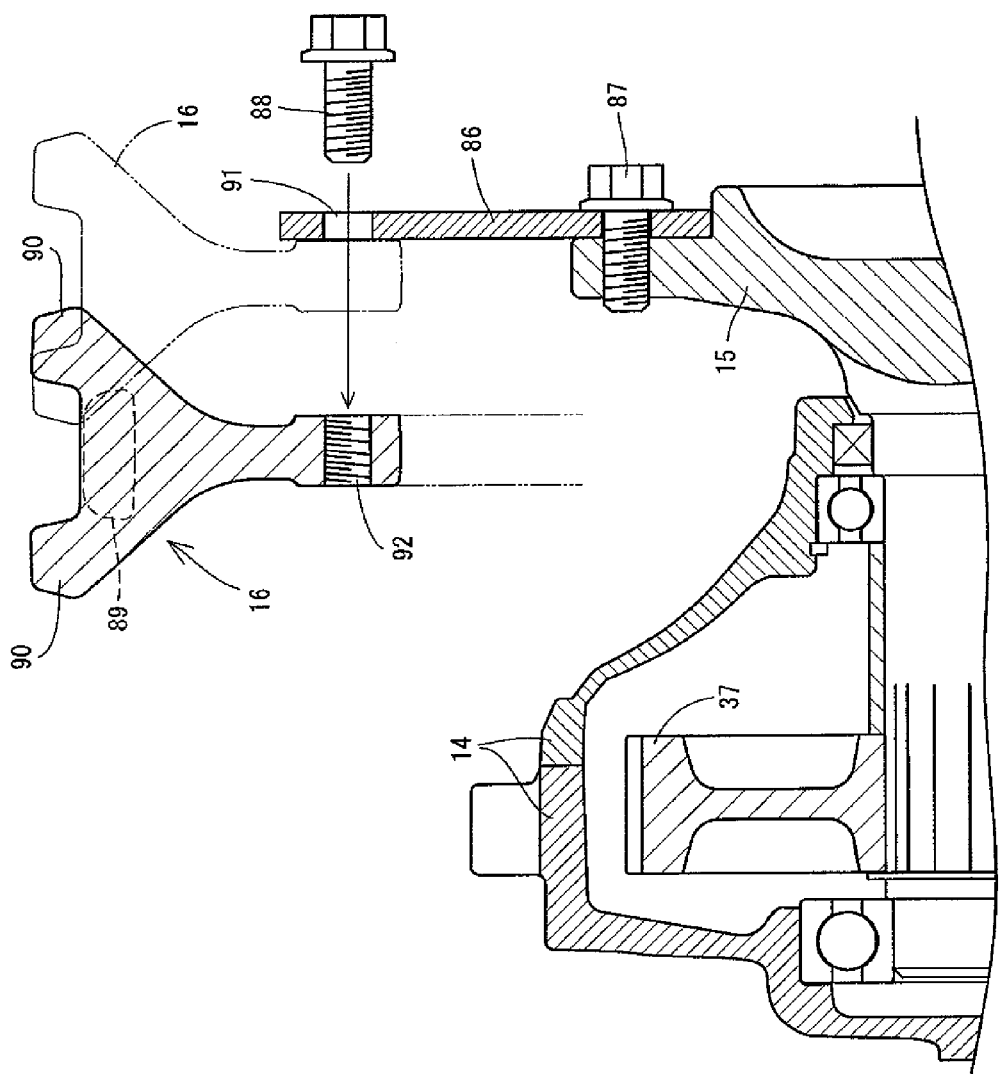
FIG. 19 is an enlarged explanatory view of a substantial part showing an attachment of the drive wheel body portion according to a modified embodiment.

Further, a description will be given of the structure of the drive wheel body 16 with reference to FIG. 17, FIG. 19, and FIG. 25. FIG. 17 is an explanatory view in which the drive wheel body 16 is arranged in a left side of the travel machine body 11, and FIG. 19 is an explanatory view in which the drive wheel body 16 is arranged in a right side of the travel machine body 11. In the structure in which the tabular rim body 86 is fastened to the rear axle 15, a through hole 91 is formed in the rim body 86 and the bolt 88 is passed through the through hole 91. A thread hole 92 is formed in the drive wheel body 16, the bolt 88 is screwed into the thread hole 92, and the drive wheel body 16 is fastened to the rim body 86.

According to the structure mentioned above, in the tractor 10 in which a forward moving time is generally longer than a backward moving time, a forward moving side surface of the gear tooth body 90 coming into contact with the cored bar claw portion 95a by the forward movement wears off more than a backward moving side surface, in the sprocket gear tooth body 90 of the drive wheel body 16. For example, in the case that the forward moving side surface of the sprocket gear tooth body 90 wears off, the forward moving side surface of the sprocket gear tooth body 90 in FIG. 17 comes to the backward moving side surface in FIG. 19, and the backward moving side surface in FIG. 17 comes to the forward moving side surface in FIG. 19, by arranging the drive wheel body 16 which is arranged in the left side of the travel machine body 11 as shown in FIG. 17, in the right side of the travel machine body 11 as shown in FIG. 19. In other words, it is possible to use the right and left drive wheel bodies 16 while setting the backward moving side surface having a less abrasion to the forward moving side surface, by replacing the right and left drive wheel bodies 16 of the travel machine body 11, whereby it is possible to reduce a parts replacing cost by elongating durable hours of the drive wheel body 16. Further, since the contact surface (the fastening surface) of the drive wheel body 16 with respect to the rim body 86 comes to the same surface between the right and the left of the travel machine body 11, it is sufficient that milling process is carried out only the contact surface (one side surface) of the driven wheel body 16, and it is possible to reduce a working cost.

Figure 25:
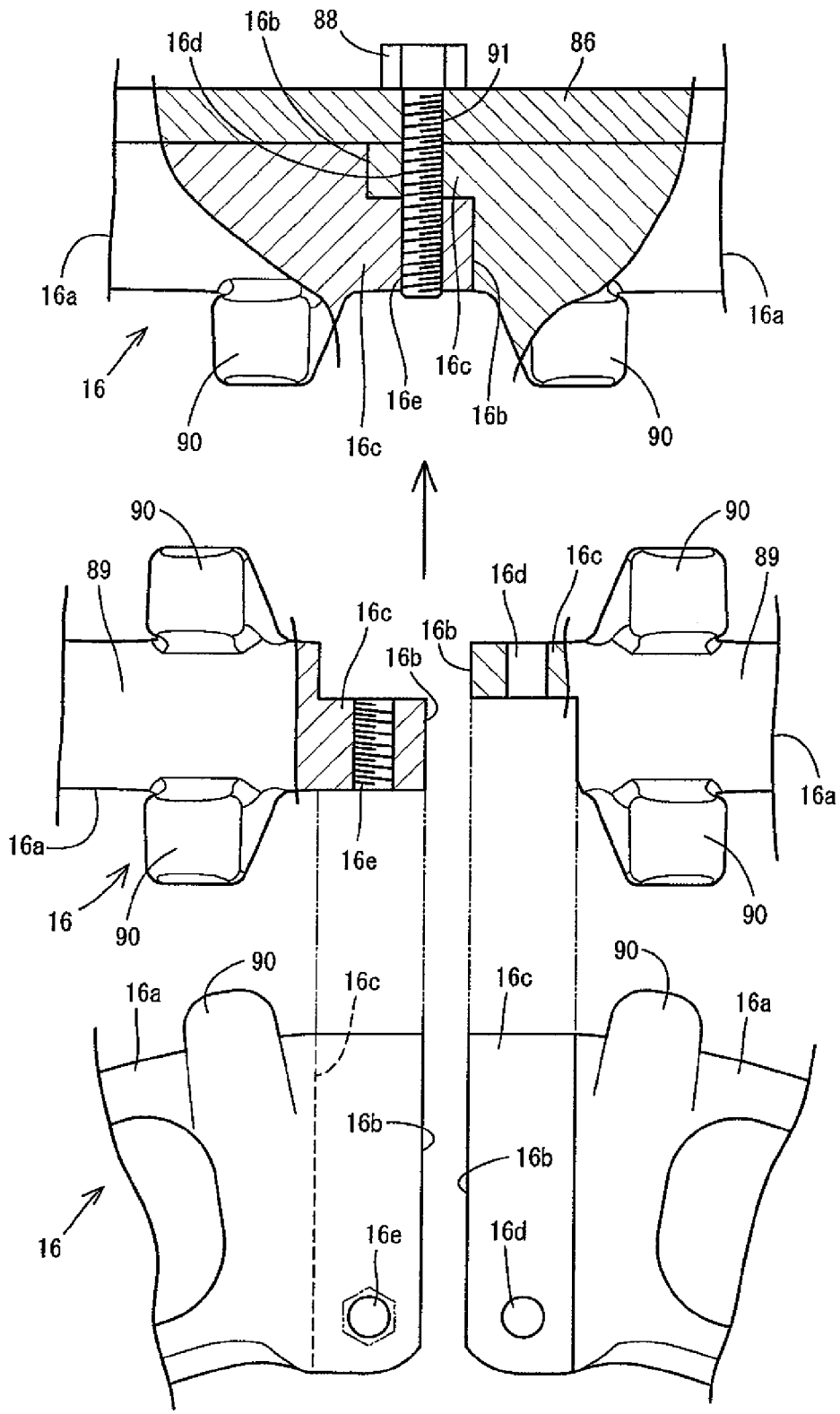
FIG. 25 is an explanatory view of a substantial part showing a connecting structure of a partial wheel body in the drive wheel body.

Further, as shown in FIG. 25, in the structure in which the drive wheel body 16 is formed by being divided into four partial wheel bodies 16a, and four partial wheel bodies 16a are connected as the ring shape by confronting the end surfaces 16b in the radial direction so as to be arranged in the same circumference, confronting step portions 16c are formed in the end surfaces 16b in both end sides of the drive wheel body 16. A through hole 16d is provided in the confronting step portion 16c of one end surface 16b which is formed thin. A thread hole 16e is provided in the confronting step portion 16c of the other end surface 16b which is formed thick.

In other words, the partial ring body 16a is brought into contact with one side surface of the rim body 86, the bolt 88 is inserted to the rim body 86 and the partial ring body 16a via the through hole 91 and the through hole 16d from the other side surface side of the rim body 86, and the bolt 88 is next inserted to the thread hole 16e of the adjacent partial ring body 16a. The confronting step portions 16c of the adjacent partial ring bodies 16a are combined, and the adjacent partial ring bodies 16a are fastened to the rim body 86 in one side surface of the rim body 86. Accordingly, it is possible to easily decide the fixed position of each of the partial ring bodies 16a on the basis of the combination of the confronting step portions 16c of the partial ring bodies 16a. Further, the worker can operate a screw attachment of the bolt 88 by supporting the partial ring body 16a by one hand and gripping a tool by the other hand.

Figure 26:
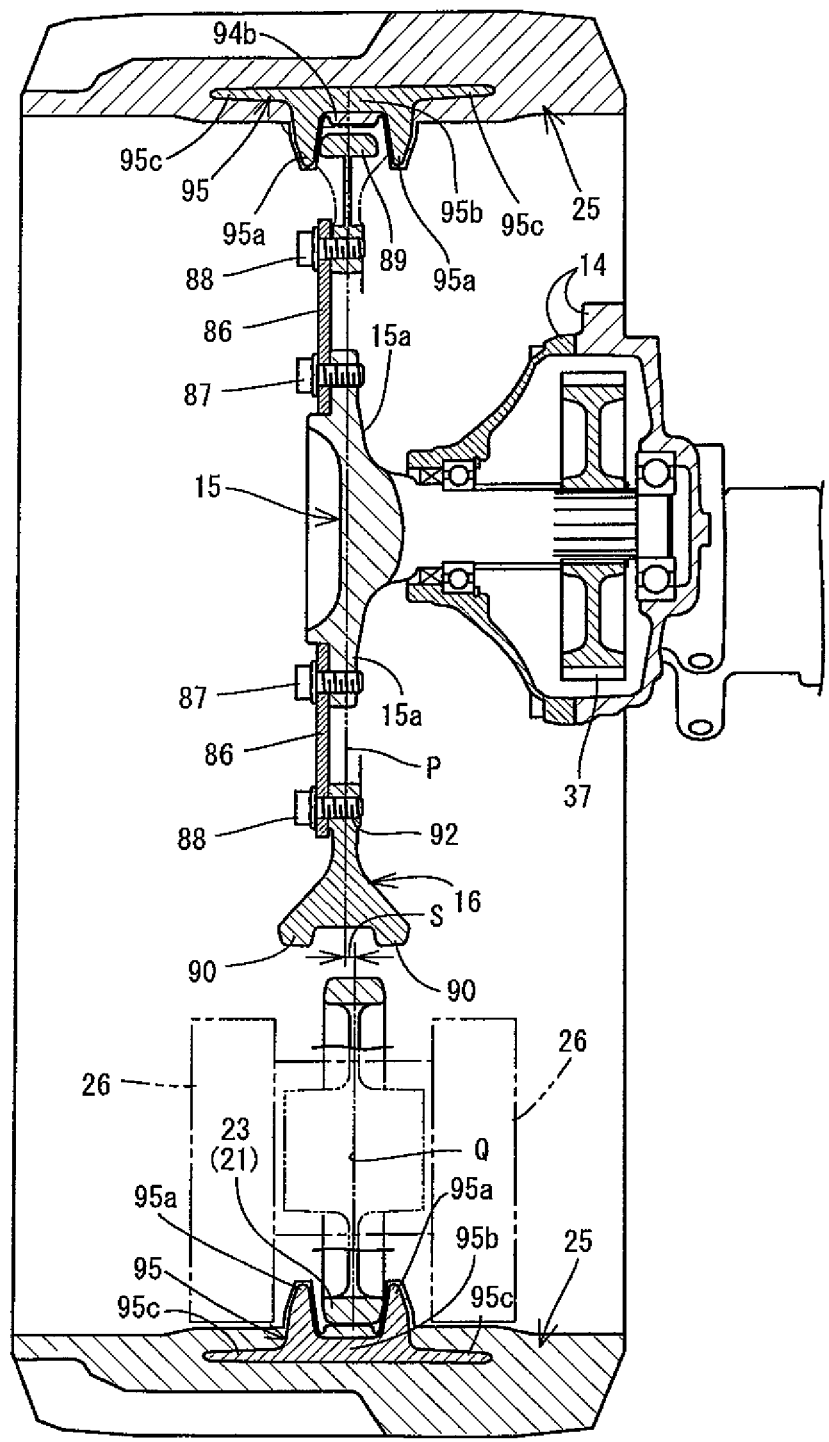
FIG. 26 is an explanatory view of a substantial part showing an arrangement of the travel crawler and the drive wheel body.

Next, a description will be given of a structure of the rear crawler travel device 13 with reference to FIG. 9, FIG. 22 to FIG. 24, and FIG. 26. As shown in FIG. 26, the travel crawler 25 is provided in a tension manner in the track frame 17 via the drive wheel body 16, the driven wheel bodies 21, 23 and the rolling wheel 26, and a center line Q of a lateral width of the driven wheel bodies 21, 23 and the rolling wheel 26 is offset at a fixed width S to the machine body inner side with respect to a center line P of the larger width of the drive wheel body 16. In other words, the drive wheel body 16 is offset to a position at which the gear tooth bottom portion 89 comes into contact in the outer side, and the driven wheel bodies 21, 23 and the rolling wheel 26 are offset to a position at which it comes into contact in an inner side thereof, with respect to the cored bar claw portion 95a of the travel crawler 25.

According to the structure mentioned above, it is possible to prevent the slide slip force (the outward force) in the swiveling outer direction of the travel crawler 25 from acting on the drive wheel body 16 by supporting the ground side of the travel crawler 25 by the driven wheel bodies 21, 23 and the rolling wheel 26. The drive wheel body 16 is appropriately engaged with the travel crawler 25. For example, even in the travel state in which the side slip force (the outward force) in the swiveling outer direction tends to be generated, and even at a time of moving a high speed under a travel driving load is high, it is possible to prevent the travel crawler 25 from breaking away from the drive wheel body 16.

Figure 22:
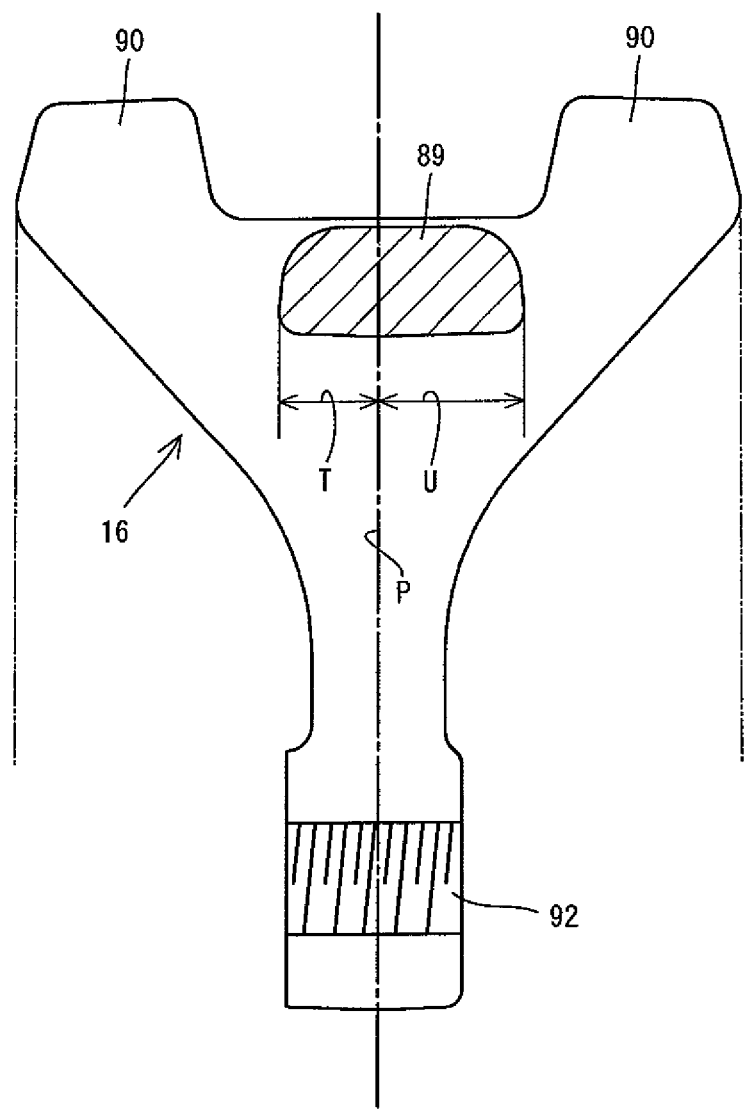
FIG. 22 is an enlarged explanatory view of a substantial part showing the drive wheel body portion according to a modified embodiment.

As shown in FIG. 22, a shape of an end surface of the gear tooth bottom portion 89 which is cut in an axial direction is formed as an asymmetrical trapezoidal shape with respect to the center of the lateral width of the drive wheel body 16, in the gear tooth bottom portion 89 of the drive wheel body 16, and the gear tooth bottom portion 89 of the drive wheel body 16 is formed such that a machine inside width U of the end surface is larger than a machine outer width T of the end surface, with respect to the center line P of the lateral width of the drive wheel body. Accordingly, in spite that the drive wheel body 16 can be easily offset to the machine outer side with respect to the driven wheel bodies 21, 23 and the rolling wheel 26, it is possible to form the drive wheel body 16 light.

Figure 23:
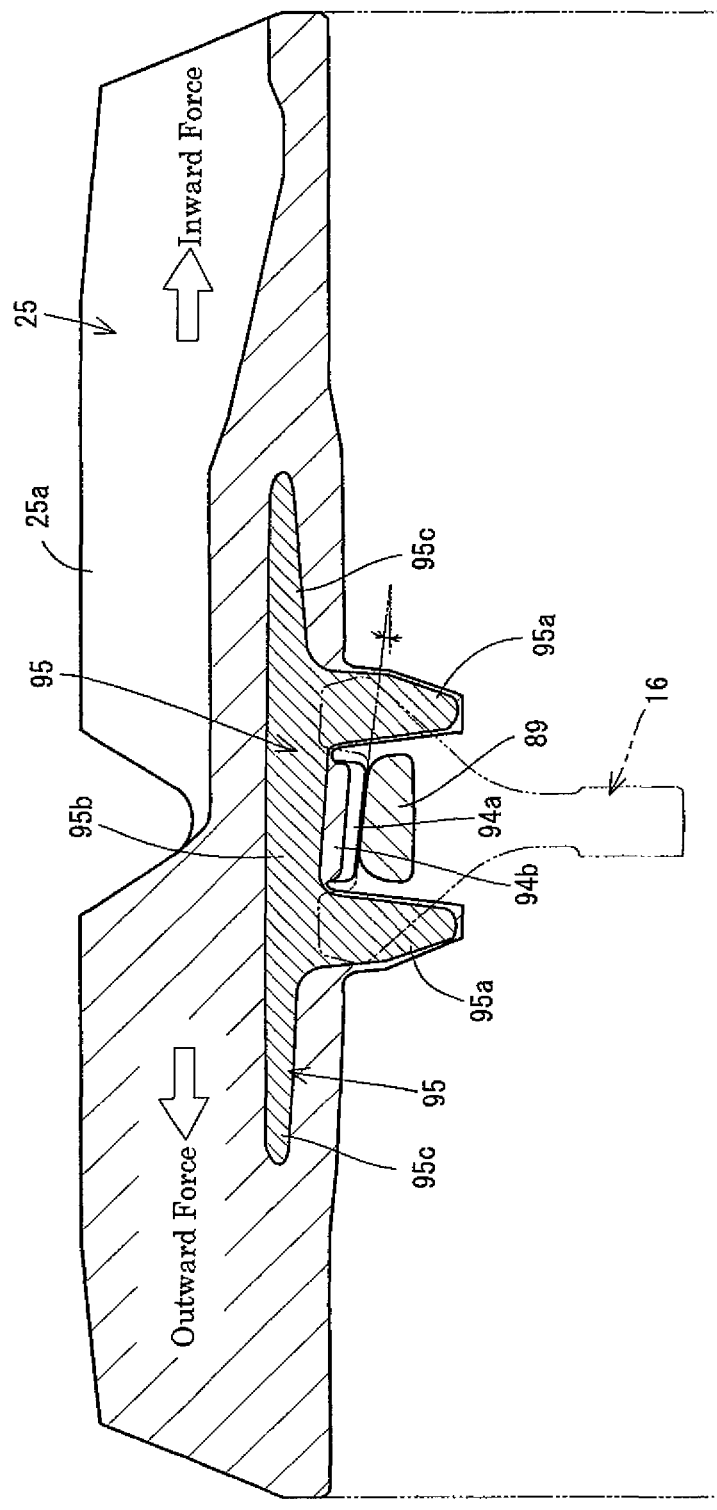
FIG. 23 is an enlarged explanatory view of a substantial part showing the travel crawler and the drive wheel body portion according to a modified embodiment.

As shown in FIG. 23, a surface through which the gear tooth bottom portion 89 of the drive wheel body 16 passes, or a surface through which the driven wheel bodies 21, 23 pass is formed as an inclined surface in which the machine body outer side is lower and the machine body inner side is higher, in the peripheral surface of the travel crawler 25, and a tension of the travel crawler 25 is increased by the inclined surface, with respect to the side slip force by which the travel crawler 25 moves to the machine body outer side. In other words, there is generated a reaction force (an inward force) for moving the travel crawler 25 to the inner side of the machine body with respect to the side slip force (the outward force) of the travel crawler 25, it is possible to prevent the travel crawler 25 from being disconnected or it is possible to suppress a biased abrasion of the travel crawler 25. The inner peripheral surface of the travel crawler 25 may be formed such that the surface through which the gear tooth bottom portion 89 of the drive wheel body 16 comes to such an inclined surface that is higher in the machine body outer side and lower in the machine body inner side. In the same manner as the inner peripheral surface of the travel crawler 25, the gear tooth bottom portion 89 may be inclined.

Figure 24:
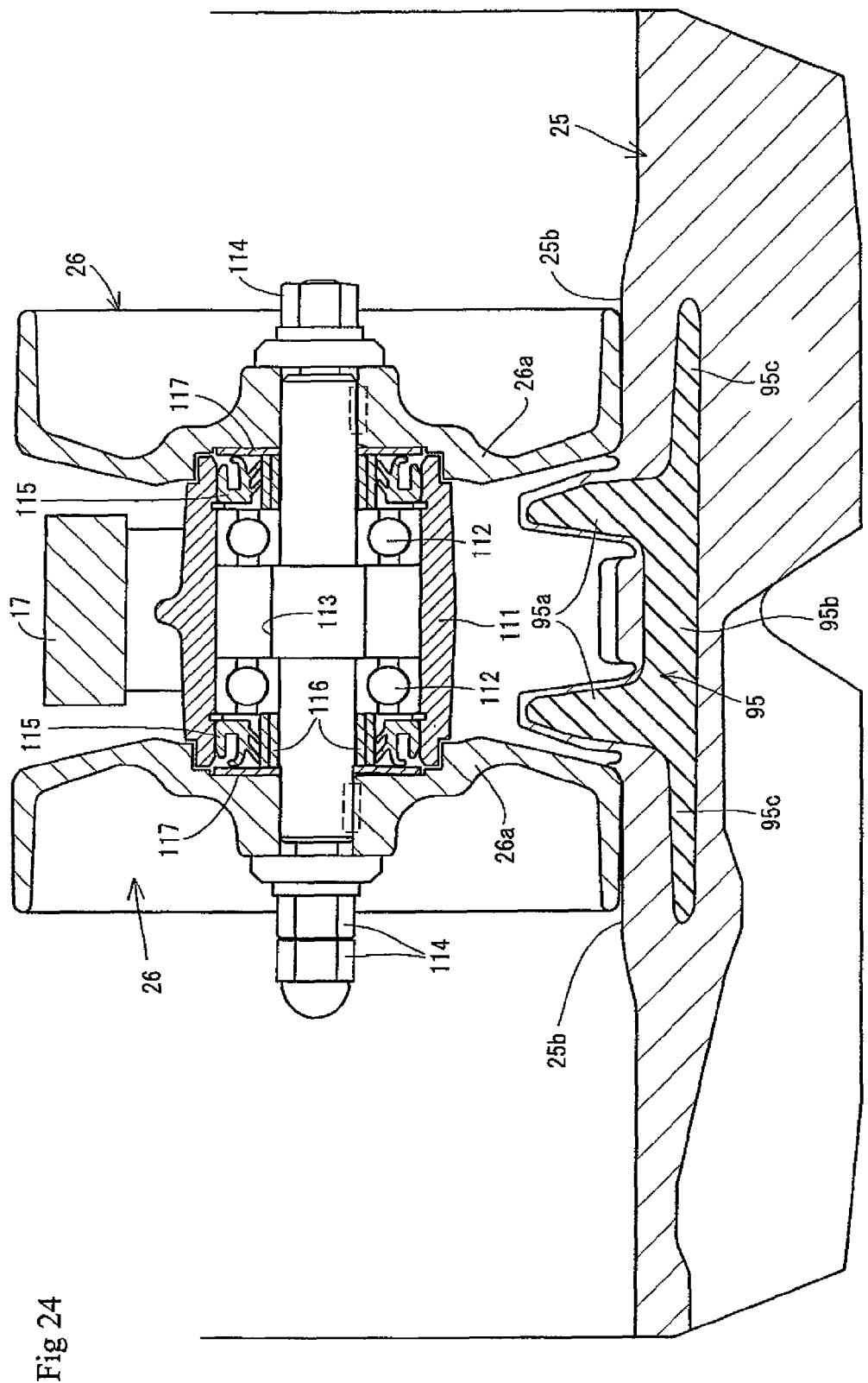
FIG. 24 is an enlarged explanatory view of a substantial part showing the travel crawler and the rolling wheel portion according to a modified embodiment.

As shown in FIG. 24, a part of the inner peripheral surface of the travel crawler 25 with which the inner side comes into contact in the peripheral surface of the rolling wheel 26 is formed as the convex inner peripheral surface 25b, and the convex inner peripheral surface 25b is formed in such a manner as to make a portion at a position of the cored bar claw portion 95a protrude most toward the inner peripheral side of the travel crawler 25. It is structured such that the convex inner peripheral surface 25b is inclined toward both side edge directions of the travel crawler 25. That is, in the ground side of the travel crawler 25, the convex inner peripheral surface 25b is formed as such an inclined surface that is highest at a position which is close to the cored bar claw portion 95a, and becomes lower toward both side edge directions of the travel crawler 25.

According to the structure mentioned above, the force returning the travel crawler 25 to a predetermined position is generated with respect to the side slip force by which the travel crawler 25 is shifted to the machine body outer side or the machine body inner side, and suppresses the biased abrasion of the travel crawler 25 or the rolling wheel 26. In other words, since the outward force is applied to each of the right and left wheel bodies of the rolling wheel 26 by the convex inner peripheral surface 25b of the travel crawler 25, the travel crawler 25 is supported to the rolling wheel 26 in such a manner that the travel crawler 25 and the rolling wheel 26 are balanced at the center position. That is, it is possible to reduce the contact between the rolling wheel 26 and the cored bar claw portion 95a, it is possible to prevent the rolling wheel 26 or the cored bar pawl portion 95a from being abraded on the basis of the contact, and it is possible to suppress the generation of the metal contact sound between them.

As shown in FIG. 1, FIG. 9 and FIG. 26, in the working vehicle provided with the travel machine body 11 which mounts the engine 8 thereon, the track frame 17 which is provided in the lower side of the travel machine body 11, and the travel crawler 25 which is installed to the track frame 17, and structured such that the travel crawler 25 is provided in a tension manner in the track frame 17 via the drive wheel body 16, the front driven wheel body 21, the rear driven wheel body 23, and the rolling wheel 26, the center line Q of the lateral width of the driven wheel bodies 21, 23 and the rolling wheel 26 is offset only at a fixed width S to the machine body inner side, with respect to the center line P of the lateral width of the drive wheel body 16. Accordingly, it is possible to easily prevent the force in the swiveling outer direction (the side slip force) from acting on the drive wheel body 16. In other words, the drive wheel body 16 is appropriately engaged with the travel crawler 25 by supporting the ground side of the travel crawler 25 by the front driven wheel body 21, the rear driven wheel body 23, and the rolling wheel 26 while offsetting the front driven wheel body 21, the rear driven wheel body 23, and the rolling wheel 26 to the machine inner side with respect to the drive wheel body 16, whereby it is possible to prevent the travel driving load from being increased. For example, even in the case that the force in the swiveling outer direction (the side slip force) tends to be generated at a time when the travel machine body 11 swivels, or even at a time of moving at a high speed under the high load of the travel driving load, it is possible to prevent the travel crawler 25 from breaking off from the drive wheel body 16.

As shown in FIG. 26, with respect to the cored bar pawl portion 95a of the travel crawler 25, the drive wheel body 16 is offset to the position at which the sprocket gear tooth bottom portion 89 comes into contact in the outer side, and the front driven wheel body 21, the rear driven wheel body 23, and the rolling wheel 26 are offset to the position at which they come into contact in the inner side thereof, respectively. Accordingly, it is possible to lighten the force by which the drive wheel body 16 or the front driven wheel body 21 and the rear driven wheel body 23 or the rolling wheel 26 come into contact with the cored bar pawl portion 95a of the travel crawler 25, and it is possible to reduce the biased abrasion of the cored bar pawl portion 95a or the drive wheel body 16 or the front driven wheel body 21 and the rear driven wheel body 23 or the rolling wheel 26.

As shown in FIG. 22, a shape of an end surface of the gear tooth bottom portion 89 which is cut in an axial direction is formed as an asymmetrical trapezoidal shape with respect to the center of the lateral width of the drive wheel body 16, in the sprocket gear tooth bottom portion 89 of the drive wheel body 16. Accordingly, despite that it is possible to weight save the drive wheel body 16 by forming the machine body inner side wider than the machine body outer side of the end surface of the gear tooth bottom portion 89 and it is possible to appropriately maintain the engagement between the travel crawler 25 and the drive wheel body 16, it is possible to easily offset the drive wheel body 16 to the machine outer side, with respect to the front driven wheel body 21, the rear driven wheel body 23, and the rolling wheel 26. Further, it is possible to reduce a manufacturing cost or a dead weight of the drive wheel body 16, for example, in comparison with a quadrangular shape or the like, by forming the end surface of the gear tooth bottom portion 89 as the trapezoidal shape.

As shown in FIG. 23, in the inner peripheral surface of the travel crawler 25, the surface through which the gear tooth bottom portion 89 of the drive wheel body 16 passes, or the surface through which the front driven wheel body 21 and the rear driven wheel body 23 passes is formed as such an inclined surface that is lower in the machine body outer side and higher in the machine body inner side. Accordingly, it is possible to increase the tension of the travel crawler 25 by the inclined surface, with respect to the side slip force by which the travel crawler 25 is moved to the machine body outer side. In other words, with respect to the side slip force of the travel crawler 25, a reaction force which moves the travel crawler 25 to the machine body inner side is generated, whereby it is possible to prevent the travel crawler 25 from breaking off, or it is possible to easily suppress the biased abrasion of the travel crawler 25.

As shown in FIG. 24, a part of the inner peripheral surface of the travel crawler 25 with which the inner side in the peripheral surface of the rolling wheel 26 comes into contact is formed as a convex shape by the convex inner peripheral surface 25b. Accordingly, it is possible to generate a force which returns the travel crawler 25 to a predetermined position with respect to the side slip force by which the travel crawler 25 is shifted to the machine body outer side or the machine body inner side, and it is possible to easily suppress the biased abrasion of the travel crawler 25 or the rolling wheel 26.

Figure 20:
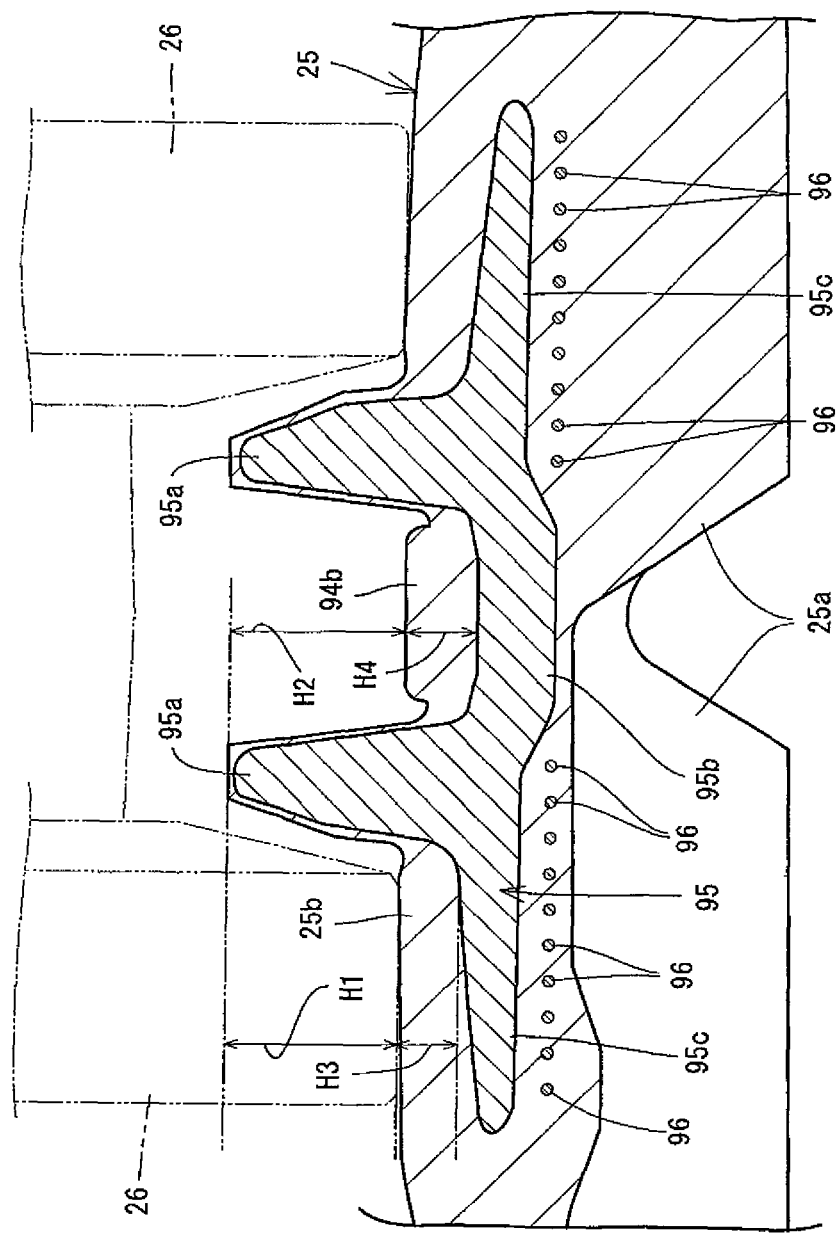
FIG. 20 is a partly enlarged cross sectional view of the travel crawler.
Figure 21:
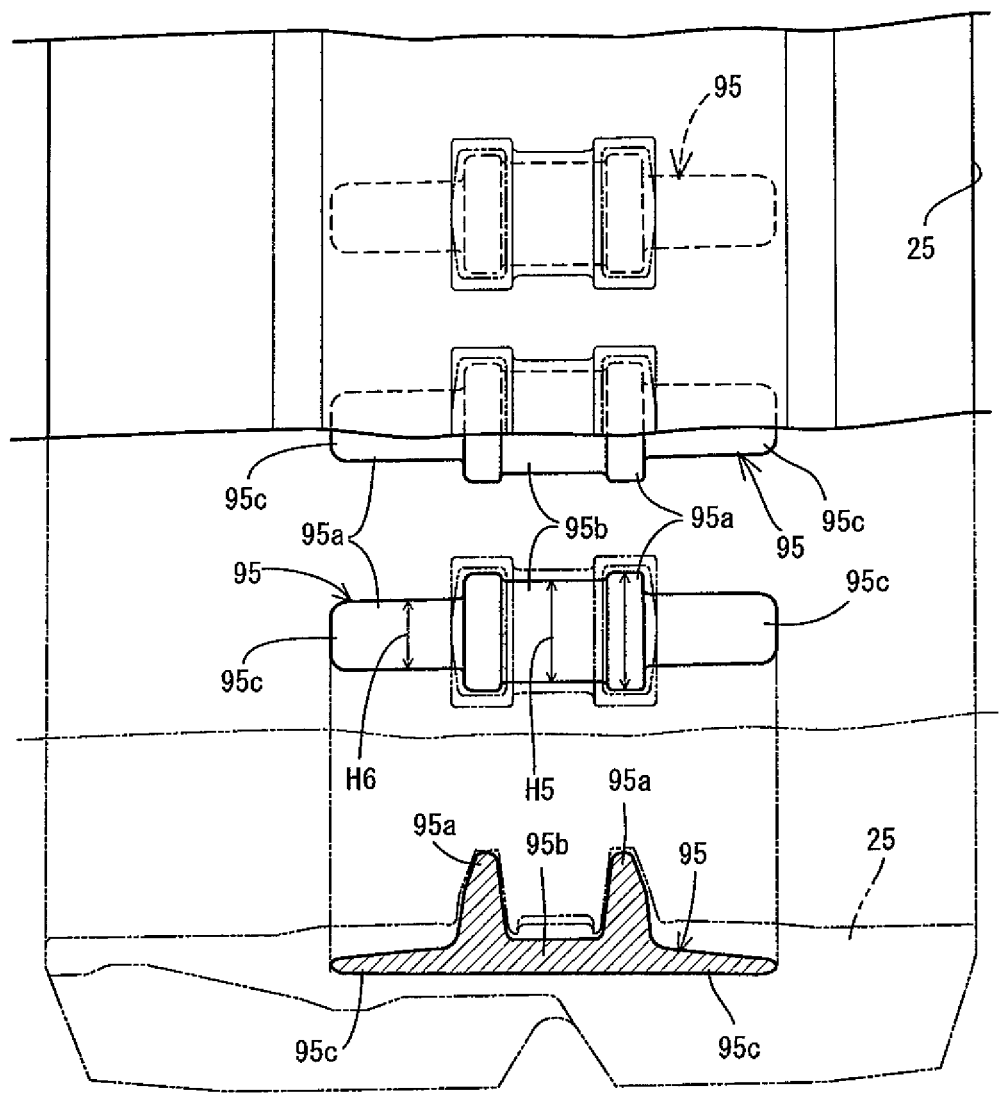
FIG. 21 is an enlarged explanatory view of a substantial part showing the travel crawler according to a modified embodiment.

Further, as shown in FIG. 20 to FIG. 21, the inner peripheral surface portion 94b is formed in the inner peripheral surface between the cored bar claw portions 95a which are adjacent in a lateral width direction of the endless band, in the inner peripheral surface of the crawler main body 94. A height dimension H2 of the cored bar claw portion 95a with respect to the inner peripheral convex surface portion 94b is formed larger than a height dimension H1 of the cored bar claw portion 95a with respect to the passing surface (the convex inner peripheral surface 25b) of the rolling wheel 26. A rubber portion of the crawler main body 94 is protruded by forming the inner peripheral convex surface portion 94b, between the cored bar claw portions 95a which are adjacent in the lateral width direction of the endless band. Accordingly, the front driven wheel body 21 and the rear driven wheel body 23 can pass on the inner peripheral convex surface portion 94*b*, and it is possible to reduce the vibration or the noise accompany the drive of the travel crawler 25.

A thickness dimension H4 of the crawler main body 94 between the cored bar claw portions 95*a* which are adjacent in the lateral width direction of the endless band (in the upper surface side of the cored bar body portion 95*b*) is formed larger in comparison with a distance between the passing surface (the convex inner peripheral surface 25*b*) of the rolling wheel 26, and the upper surface of the root portion of the vane piece portion 95*c* of the cored bar body 95, that is, a thickness dimension H3 of the crawler main body 94 of the passing surface portion of the rolling wheel 26. Accordingly, it is possible to secure a difference in height between the center portion of the lateral width of the crawler main body 94 and the upper portion of the cored bar claw portion 95, and it is possible to inhibit the travel crawler 25 from being disconnected even if the side slip force or an inclining force acts on the travel crawler 25.

Further, the cored bar body portion 95*b* is protruded to the outer peripheral side of the travel crawler 25, and a reinforcing steel cord 96 is embedded in both sides of the cored bar body portion 95*b* in the crawler main body 94. It is structured such as to hold down the thickness of the crawler main body 94 to the minimum. Further, the cored bar body 95 is formed such that a width H5 of the cored bar body portion 95*b* is wider in comparison with a width H6 of the vane piece portion 95*c*. Thus, it is possible to secure a strength of the cored bar body 95, and it is possible to reduce the peeling of the crawler main body 94 with respect to the cored bar body 95, for example, by forming a concave portion on a surface of the cored bar body portion 95*b* so as to enlarge a rubber adhesion area with the crawler main body 94, whereby it is possible to reduce an intrusion of a muddy water between the crawler main body 94 and the cored bar body 95.

Figure 27:
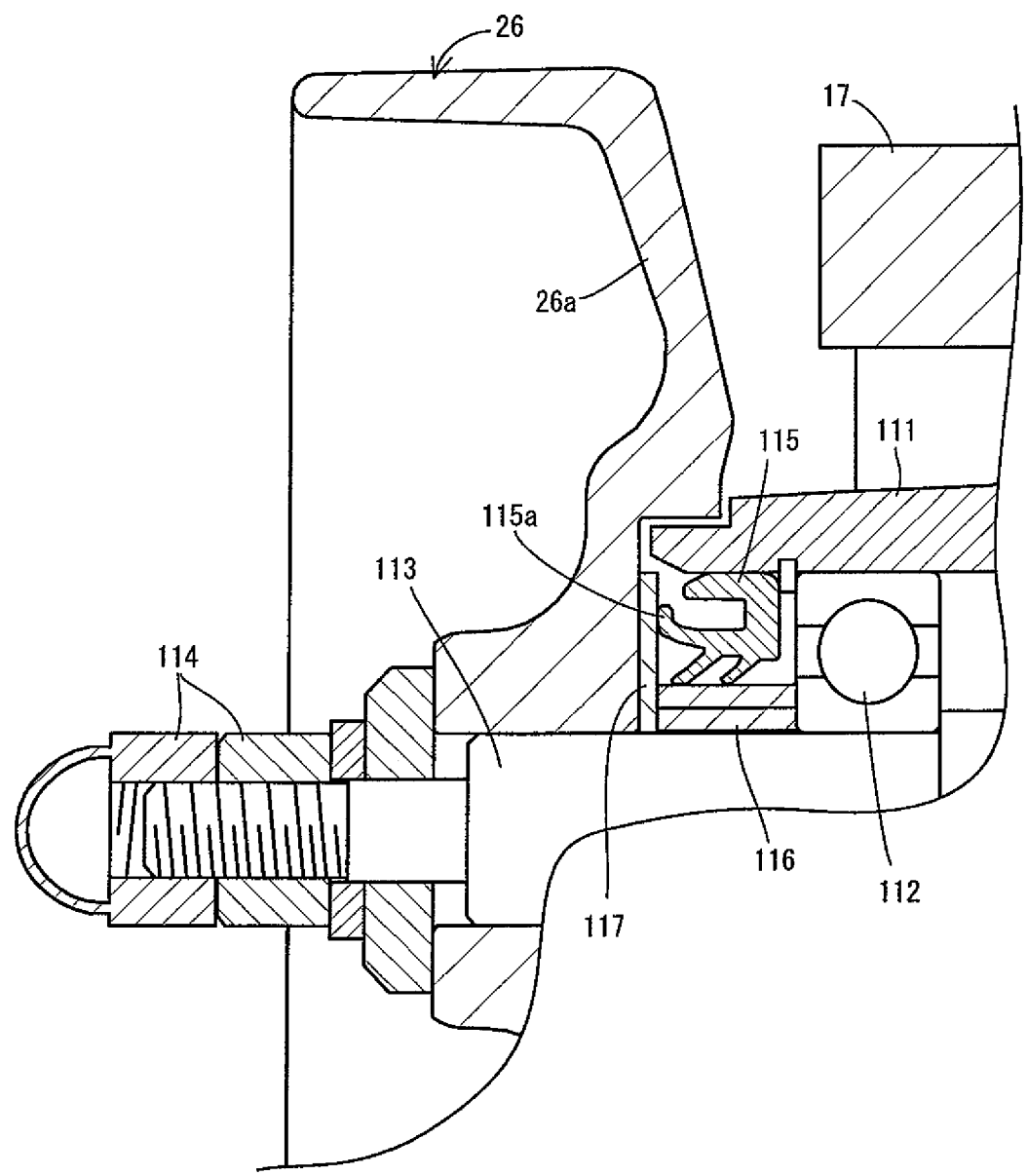
FIG. 27 is an enlarged explanatory view of a substantial part showing a bearing structure of the rolling wheel portion.

Next, a description will be given of a support structure of the rolling wheel 26 which has a pair of right and left track rollers 26*a* with reference to FIG. 24, and FIG. 27 to FIG. 36. As shown in FIG. 24 and FIG. 27, a roller support tube body 111 is fastened by bolt to the lower surface of the track frame 17. A roller shaft body 113 is rotatably pivoted via a pair of bearing shaft bushes 112. Both end sides of the roller shaft body 113 are protruded out of right and left openings of the roller support tube body 111 toward right and left outer sides. A pair of right and left track rollers 26*a* is firmly fixed to both end portions of the roller shaft body 113 by a fastening nut 114. A dust seal 115 is provided in an outer side of the bearing shaft bush 112 in the right and left opening portions of the roller support tube bodies 111. In this case, a lubricating oil (a grease) is filled between a pair of bearing shaft bushes 112.

Further, as shown in FIG. 27, the dust seal 115 is fitted to the roller shaft body 113 in an outer side of the bearing shaft bush 112 via a sleeve 116 (or a collar). A friction suppressing plate body 117 is pinched between the track roller 26*a* and the sleeve 116. In other words, at a time of fastening the fastening nut 114, the sleeve 116 and the friction suppressing plate body 117 are firmly fixed between the track roller 26*a* and the bearing shaft bush 112, and the friction suppressing plate body 117 is brought into contact with a lip 115*a* of the dust seal 115. Accordingly, it is possible to suppress an abrasion of the lip 115*a* and a contact surface due to a muddy water intrusion, and it is possible to prevent the muddy water from making an intrusion into an inner portion of the bearing shaft bush 112.

Figure 28:
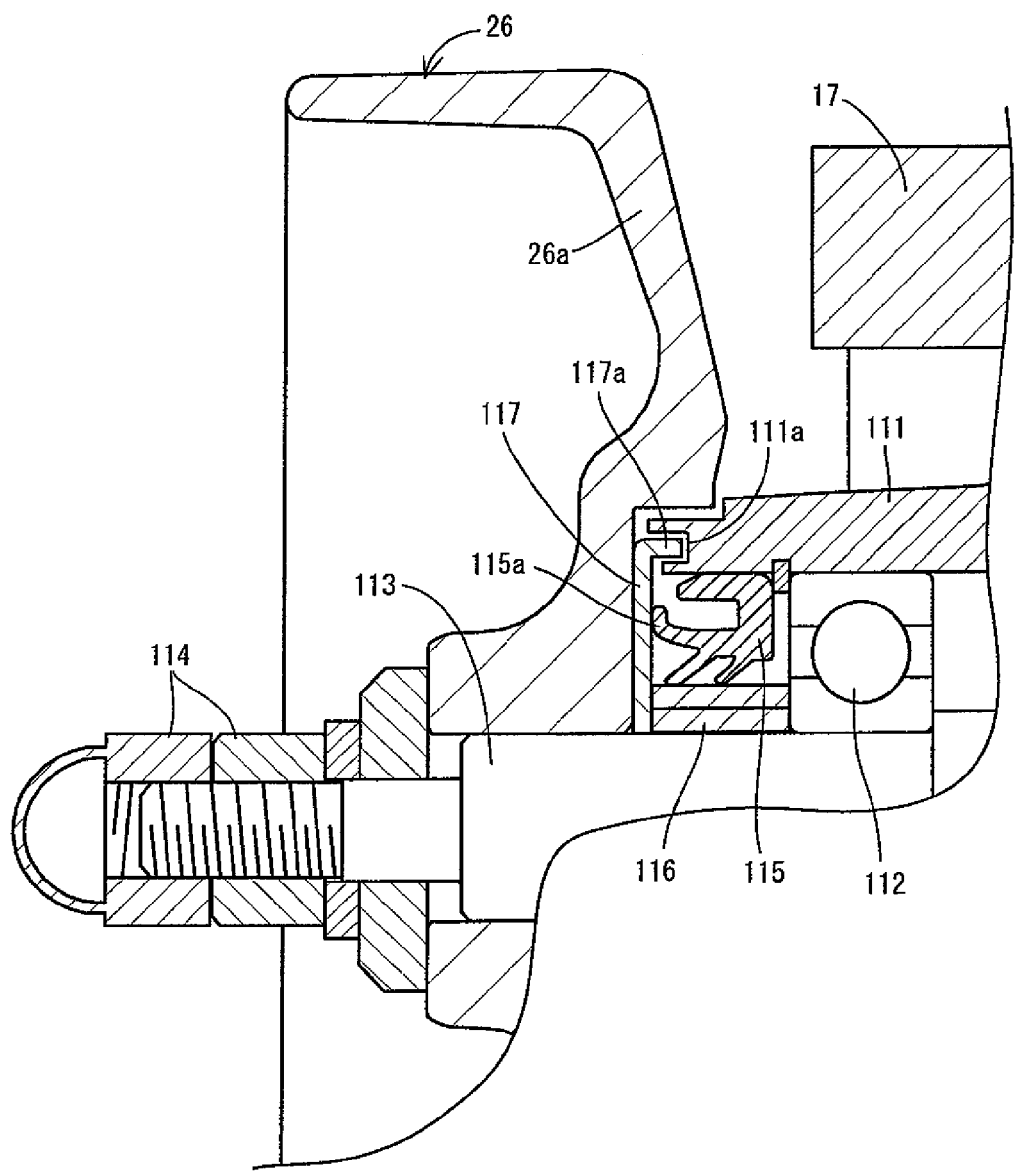
FIG. 28 is an enlarged explanatory view of a substantial part showing the bearing structure of the rolling wheel portion according to a modified embodiment.

Further, as shown in FIG. 28, a labyrinth concave portion 111*a* may be formed in right and left opening edges of the roller support tube body 111, an outer peripheral side end surface 117*a* of the friction suppressing plate body 117 may be bent to the roller support tube body 111 side, the outer peripheral side end surface 117*a* may be inserted in a loosely fitted manner to the labyrinth concave portion 111*a*, and a labyrinth gap may be formed by the labyrinth concave portion 111*a* and the outer peripheral side end surface 117*a*, thereby suppressing a winding of a grass or the like, an intrusion of the muddy water or the like, and preventing the dust seal 115 from being damaged.

Figure 29:
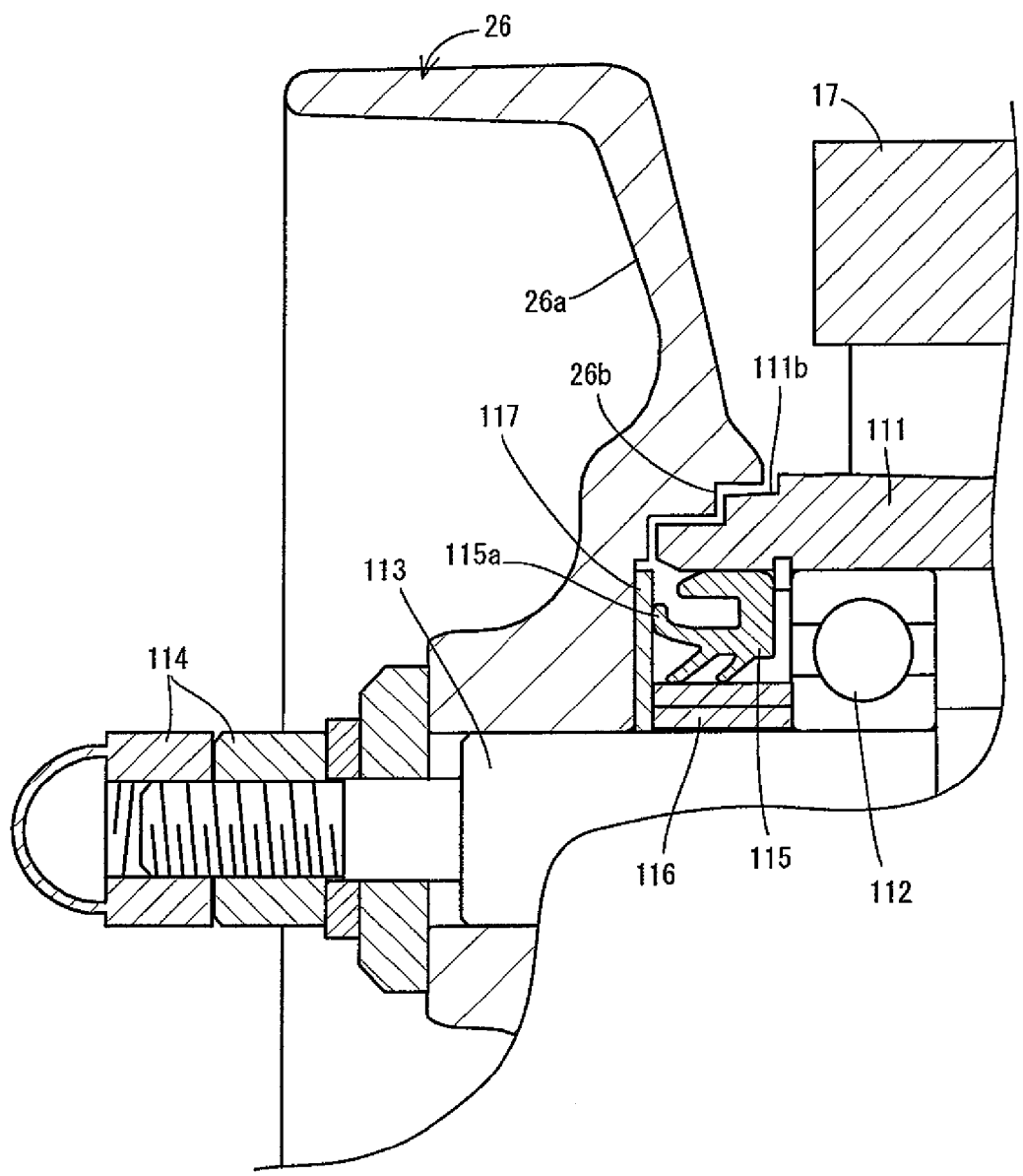
FIG. 29 is an enlarged explanatory view of a substantial part showing the bearing structure of the rolling wheel portion according to a modified embodiment.

Further, as shown in FIG. 29, a labyrinth multistage portion 111*b* may be formed in right and left opening edges of the roller support tube body 111, a multistage end surface 26*b* having a similar shape to the labyrinth multistage portion 111*b* may be formed in an opposed surface of the track roller 26*a*, and a labyrinth gap may be formed by opposing the multistage end surface 26*b* having the similar shape to the labyrinth multistage portion 111*b*, thereby suppressing the winding of the grass or the like, the intrusion of the muddy water or the like, and preventing the dust seal 115 from being damaged.

Figure 30:
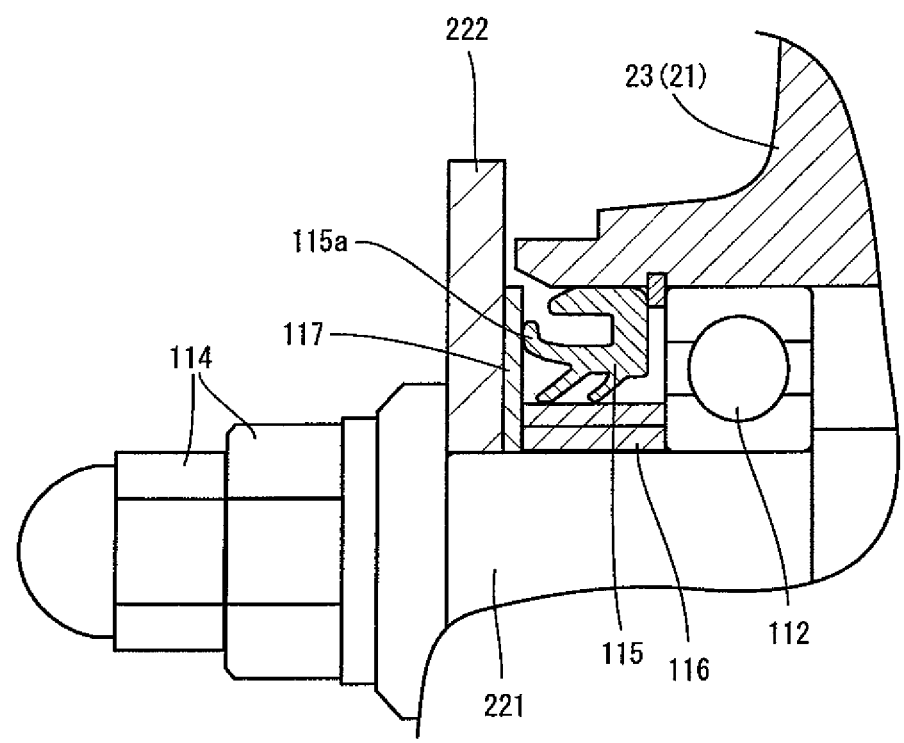
FIG. 30 is an enlarged explanatory view of a substantial part showing a bearing structure of the driven wheel portion.

In this case, FIG. 30 is a partly enlarged view of the front driven wheel body 21 (or the rear driven wheel body 23), which has a structure in which the driven wheel bodies 21, 23 are pivoted to the driven wheel shaft body 21 via the bearing shaft bush 112, and a driven wheel shaft body 221 is fastened by the nut 114 to a driven wheel holder 222 provided in the track frame 17, the dust seal 115, the sleeve 116, and the friction suppressing plate body 117 are assembled in the same manner as FIG. 27, the sleeve 116 and the friction suppressing plate body 117 are firmly fixed between the driven wheel holder 222 and the bearing shaft bush 112 at a time of fastening the fastening nut 114, and the friction suppressing plate body 117 is brought into contact with the lip 115*a* of the dust seal 115, whereby it is possible to suppress the friction of the lip 115*a* and the contact surface thereof caused by the muddy water intrusion, and it is possible to prevent the muddy water from making an intrusion into the inner portion of the bearing shaft bush 112.

Figure 31:
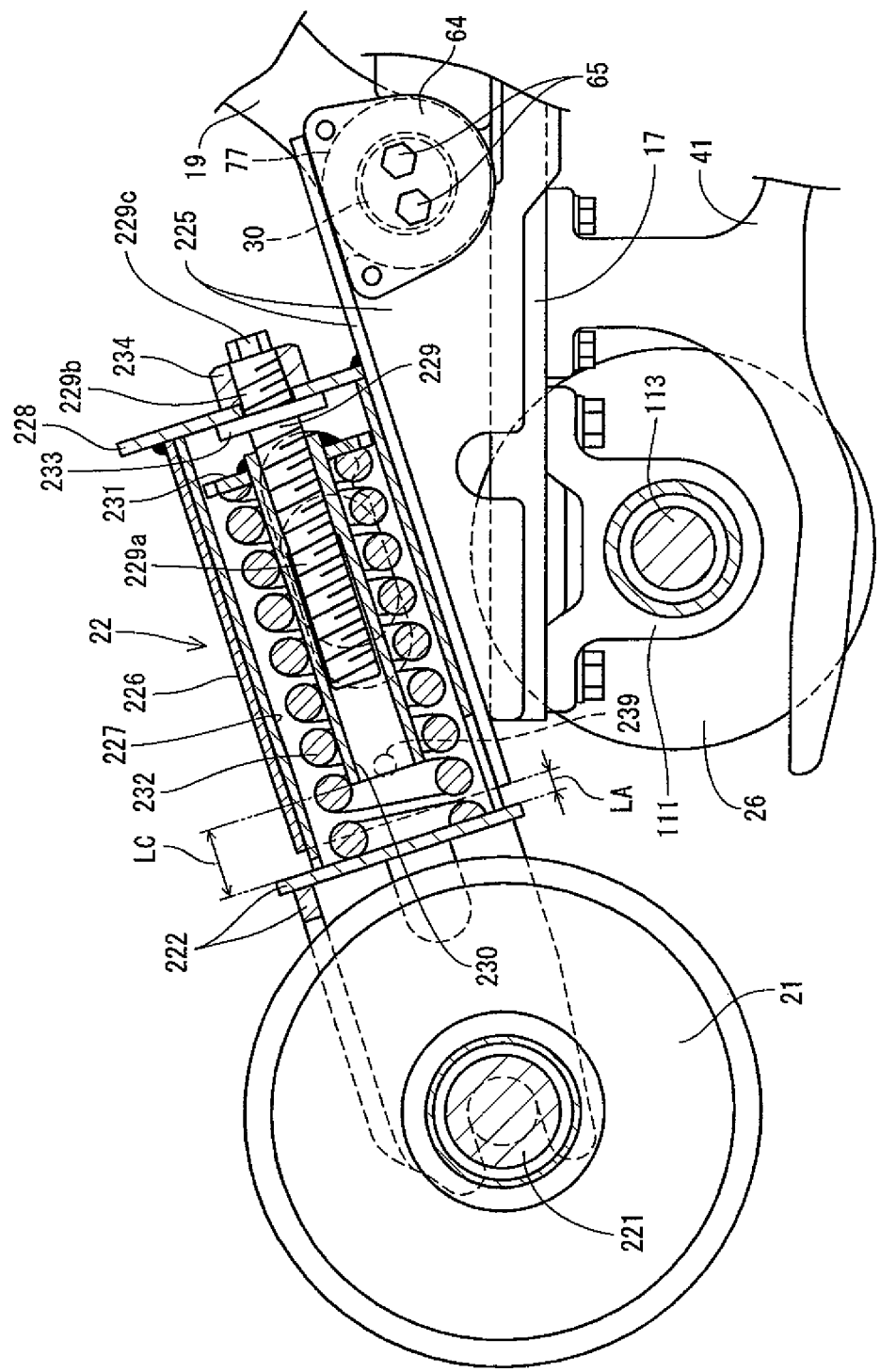
FIG. 31 is a cross sectional side elevational view of a substantial part showing a tension structure of a front driven wheel.
Figure 32:
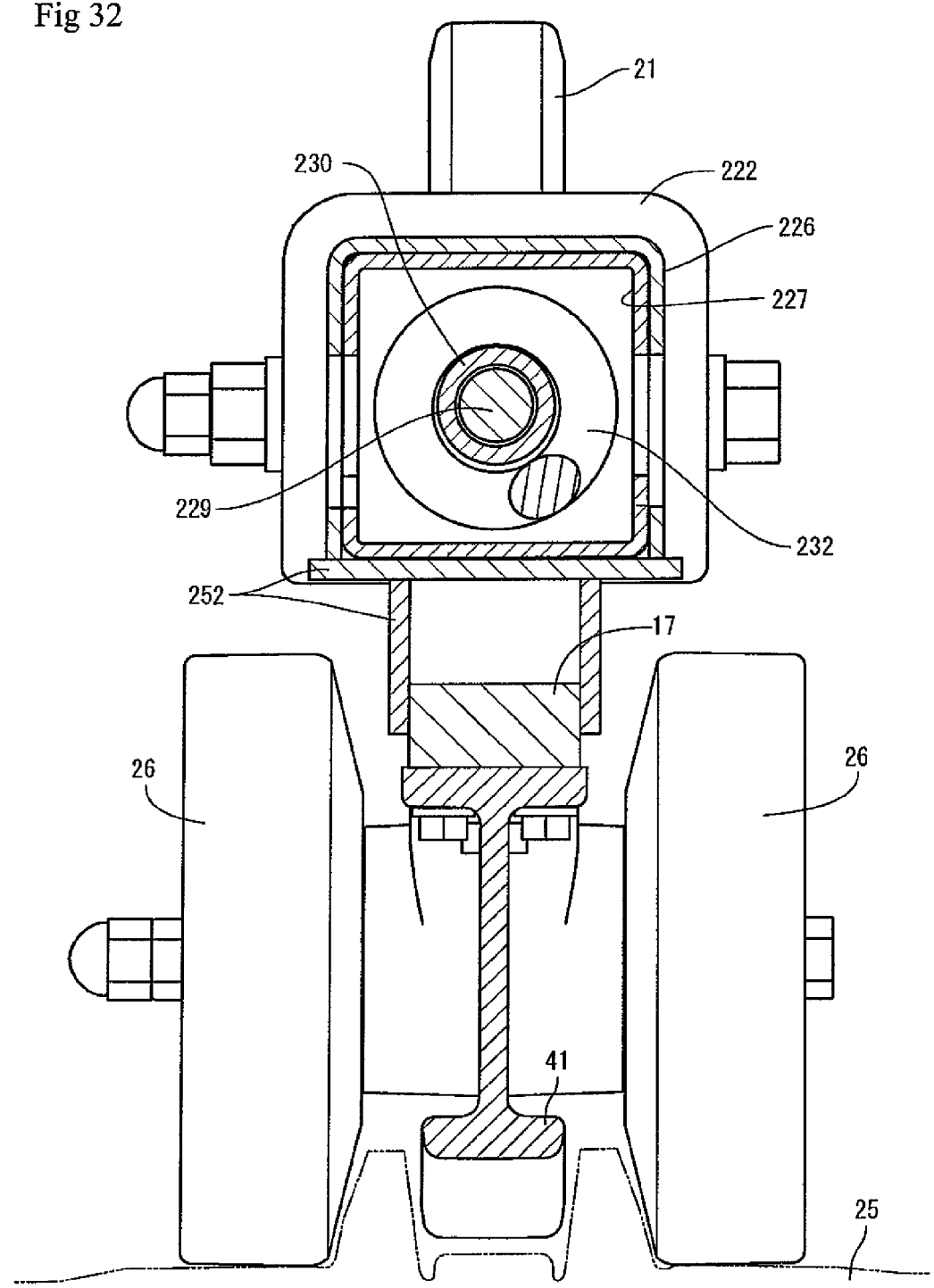
FIG. 32 is a cross sectional back elevational view of a substantial part showing the tension structure of the front driven wheel.

Next, a description will be given of a structure of the track frame 17 and the tension regulating mechanism 22 with reference to FIG. 3, FIG. 4, and FIG. 31 to FIG. 33. As shown in FIGS. 31 and 32, the tension regulating mechanism 22 has a bed plate frame 225 which is firmly attached to the upper surface of the front portion of the track frame 17, an outer tube body 226 which is firmly fixed to an upper surface of the bed plate frame 225, an inner tube body 227 which is formed as an end surface quadrangular shape and is inserted to a rectangular space formed by the bed plate frame 225 and the outer tube body 226 from a front opening thereof so as to freely come in and out, a support plate body 228 which occludes a rear opening of the rectangular space formed by the bed plate frame 225 and the outer tube body 226, a tension bolt 229 which is rotatably supported to the support plate body 228, a slide tube body 230 which is engaged with a tension screw portion 229*a* of the tension bolt 229 extended to an inner portion of the inner tube body 227, a tension spring seat 231 which is firmly fixed to the slide tube body 230 serving as a screw attachment body, and a tension spring 232 which is provided between the driven wheel holder 222 firmly fixed to a front end portion of the inner tube body 227 and the tension spring seat 231.

Figure 33:
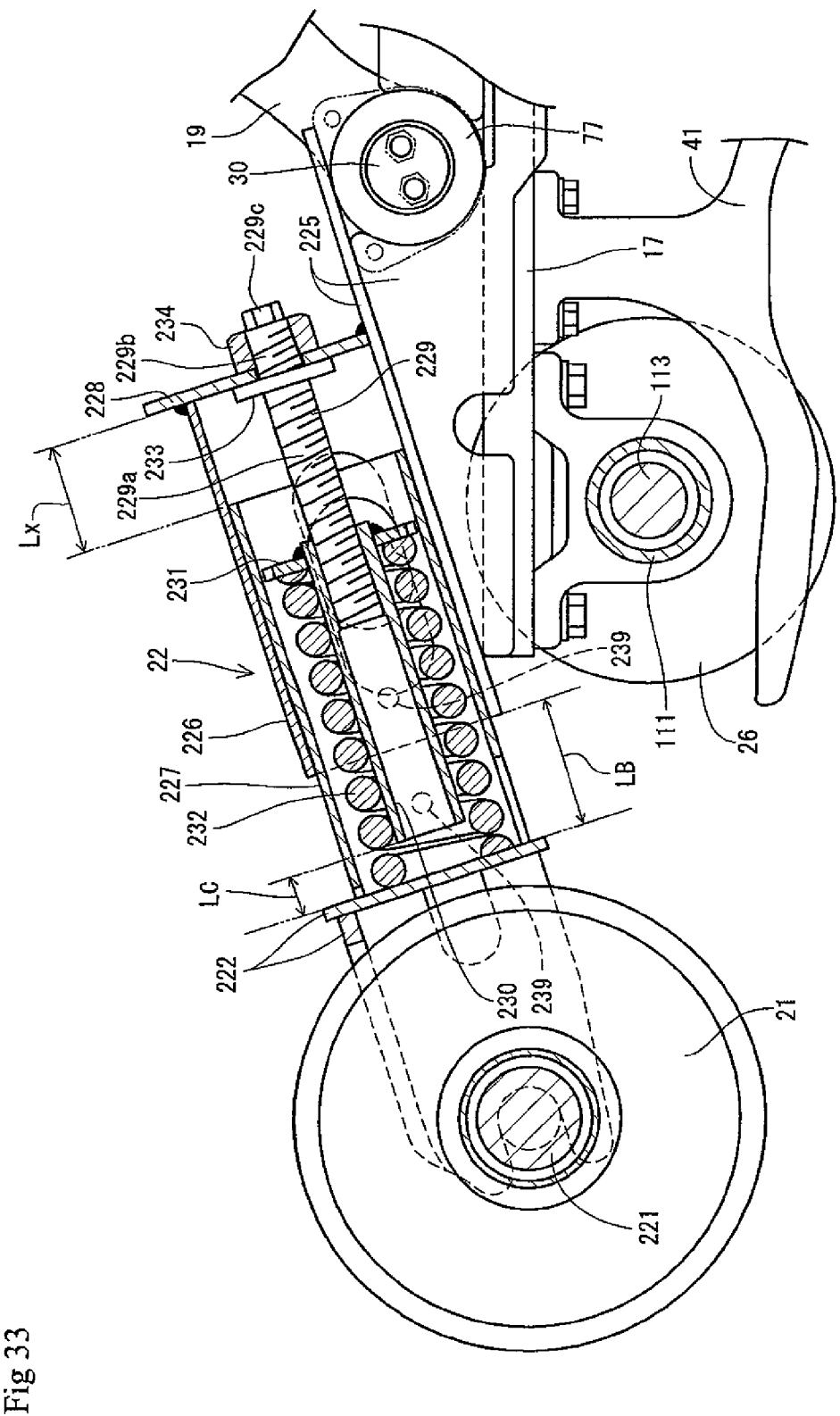
FIG. 33 is an explanatory view of an actuation of FIG. 31.

As shown in FIG. 31 and FIG. 33, the tension spring 232 is wound and supported around an outer peripheral side of the slide tube body 230 in a loosely fitted manner. The tension spring seat 231 is connected to the tension screw portion 229a of the tension bolt 229 via the slide tube body 230. Further, an elastic press stopper body 233 is firmly fixed to an end portion of the tension bolt 229 in a side which is protruded to a rear side of the outer tube body 226. The elastic press stopper body 233 is brought into contact with an inner surface side of the support plate body 228. An end portion of the tension bolt 229 is protruded to a rearward outer side of the outer tube body 226. An idle running prevention nut body 234 is attached by screw to a protruding end screw portion 229b of the tension bolt 229. A rotation operating corner head portion 229c is formed in the protruding end screw portion 229b of the tension bolt 229.

In other words, the protruding end screw portion 229b is passed through the support plate body 228, the elastic press stopper body 233 is crimped to an inner surface side of the support plate body 228, the idle running prevention nut 234 is crimped to an outer surface side of the support plate body 228, the tension bolt 229 is fixed and supported to the support plate body 228, and a force of the tension spring 232 is borne by the tension spring seat 231. As an idler fork which supports the front driven wheel body 21 and can expand and contract, the outer tube body 226 and the inner tube body 227 are provided. A longitudinal length of the outer tube body 226 and the inner tube body 227 is elongated by the tension spring 232 and it is structured such as to maintain a tensile force of the travel crawler 25 approximately constant.

As shown in FIG. 31 and FIG. 33, the tension bolt 229 is provided in the support plate body 228 which is a part of the idler fork, and it is structured such as to bear the force of the tension sprig 232 by the tension spring seat 231 and regulate the force of the tension spring 232 by the tension bolt 229. In other words, a wrench (not shown) is locked to the rotation operating corner head portion 229c which serves as an operating portion of the tension bolt 229 connected to the idler fork so as to be loosely rotatable, under a state in which the idle running prevention nut 234 is loosened, the tension bolt 229 is rotationally operated by the wrench, a connection length of the tension bolt 229 and the slide tube body 230 is changed, and the tension spring 232 is extruded toward a front side of the outer tube body 226 by the tension spring seat 231. The force of the tension spring 232 is increased by an extruding operation of the tension spring 232, and a front portion of the inner tube body 227 is extruded toward a front side from a front opening of the outer tube body 226.

As a result, when the tensile force of the travel crawler 25 is lowered, the front driven wheel body 21 is moved to the front side of the track frame 17 on the basis of the rotating operation of the tension bolt 229, the tensile force of the travel crawler 25 is increased, and the tensile force of the travel crawler 25 is maintained constant. As shown in FIG. 33, in the case that a protruding length LB of the inner tube body 227 which protrudes out of a front end opening of the outer tube body 226 is long (a state in FIG. 33), that is, in the case that a distance Lx between the inner tube body 227 and the support plate body 228 is larger than a spring stroke LC which corresponds to a distance between the driven wheel holder 222 and the slide tube body 230, the spring stroke LC which corresponds to the distance between the driven wheel holder 222 and the slide tube body 230 is held approximately constant. In other words, when the distance Lx is larger than the spring stroke LC, the stroke of the tension spring 232 is decided by the distance Lx.

On the other hand, if the tensile force of the travel crawler 25 is equal to or more than a fixed value even in the case that the protruding length LA of the inner tube body 227 which protrudes out of the front end opening of the outer tube body 226 is short, that is, in the case that the distance Lx between the inner tube body 227 and the support plate body 228 is smaller than the spring stroke LC which corresponds to the distance between the driven wheel holder 222 and the slide tube body 230, the spring stroke LC which corresponds to the distance between the driven wheel holder 222 and the slide tube body 230 is held approximately constant. In a state in the process of an assembly before the tensile force is loaded to the travel crawler 25 shown in FIG. 31, when the tensile force of the travel crawler 25 is equal to or less than a fixed value in the case that the distance Lx is smaller than the spring stroke LC, the spring stroke LC changes. In other words, since the spring stroke LC fluctuates in accordance with a fluctuation of the tensile force of the travel crawler 25, there is a case that the stroke of the tension spring 232 is decided by the spring stroke LC at a time when the distance Lx is smaller than the spring stroke LC.

Further, since a protruding amount of the rotation operating corner head portion 229c which protrudes to an outer side of the support plate body 228 is always fixed, and the corner head portion 229c is supported at an approximately fixed position in an outer side of the support plate body 228, it is possible to sufficiently secure a space for installing the wrench or the like which serves as the rotation operating device, between the bearing tube body 77 of the front lower end pivot shaft 30 and the corner head portion 229c.

A positioning hole 239 is formed in each of the outer tube body 226 which serves as a fixed side case body of the idler fork, and the inner tube body 227 which serves as a movable side case body of the idler fork. At a time of assembling the inner tube body 227 in the outer tube body 226, the positioning hole 239 of the inner tube body 227 is brought into line with the positioning hole 239 of the outer tube body 226, a rod-like body such as a pin is inserted to each of the positioning holes 239, the inner tube body 227 is fixed to the outer tube body 226, and the idle running prevention nut body 234 or the like can be attached in a state in which a displacement or a dropout of the outer tube body 226 and the inner tube body 227 is prevented.

Figure 34:
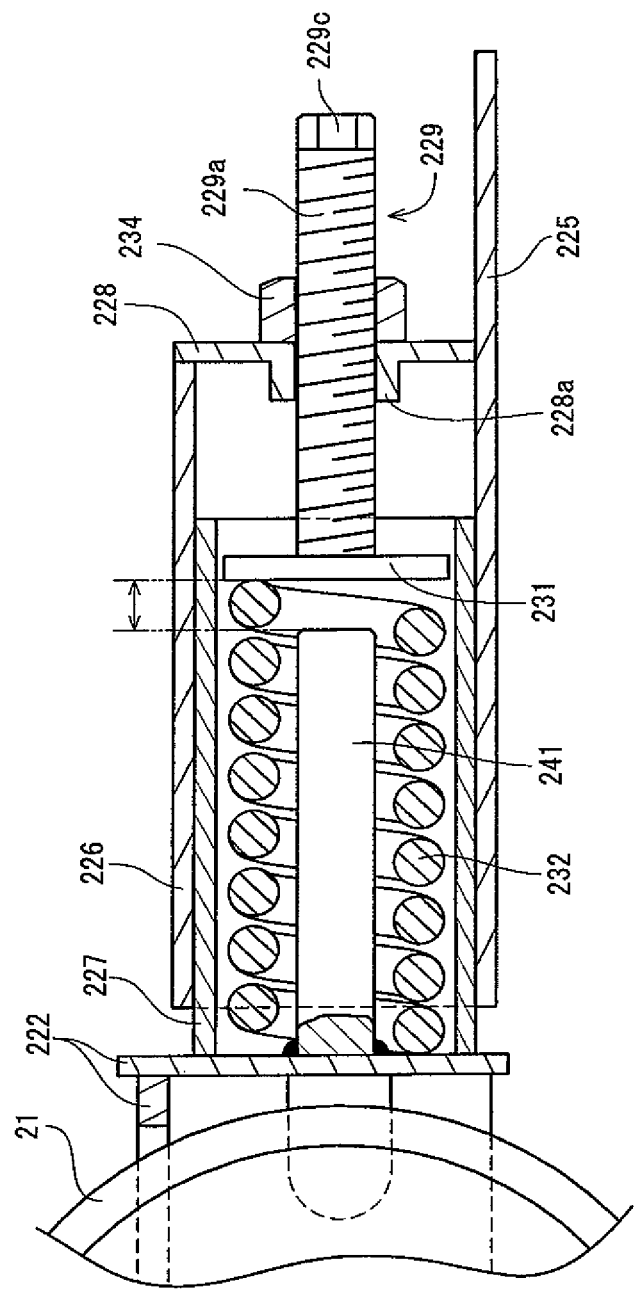
FIG. 34 is a cross sectional explanatory view of a substantial part showing the tension structure of the front driven wheel according to a modified embodiment.

A description will be given of a stroke regulating structure of the tension spring 232 with reference to FIG. 34 to FIG. 36. As shown in FIG. 34, a spring compression stopper 241 is provided in the driven wheel holder 222 which is opposed to the tension spring seat 231 of the tension bolt 229, the spring compression stopper 241 is arranged in the driven wheel holder 222 which serves as a part of the idler fork, the tension spring seat 231 is brought into contact with the spring compression stopper 241, and an amount of compression of the tension spring 232 is regulated by the spring compression stopper 241. In this case, the tension screw portion 229a of the tension bolt 229 is attached by screw to a screw portion 228a of the support plate body 228, the tension bolt 229 is firmly fixed to the support plate body 228 by the idle running prevention nut body 234, and the tension bolt 229 is rotated by loosening the idle running prevention nut body 234, thereby regulating the force of the tension spring 232.

Figure 35:
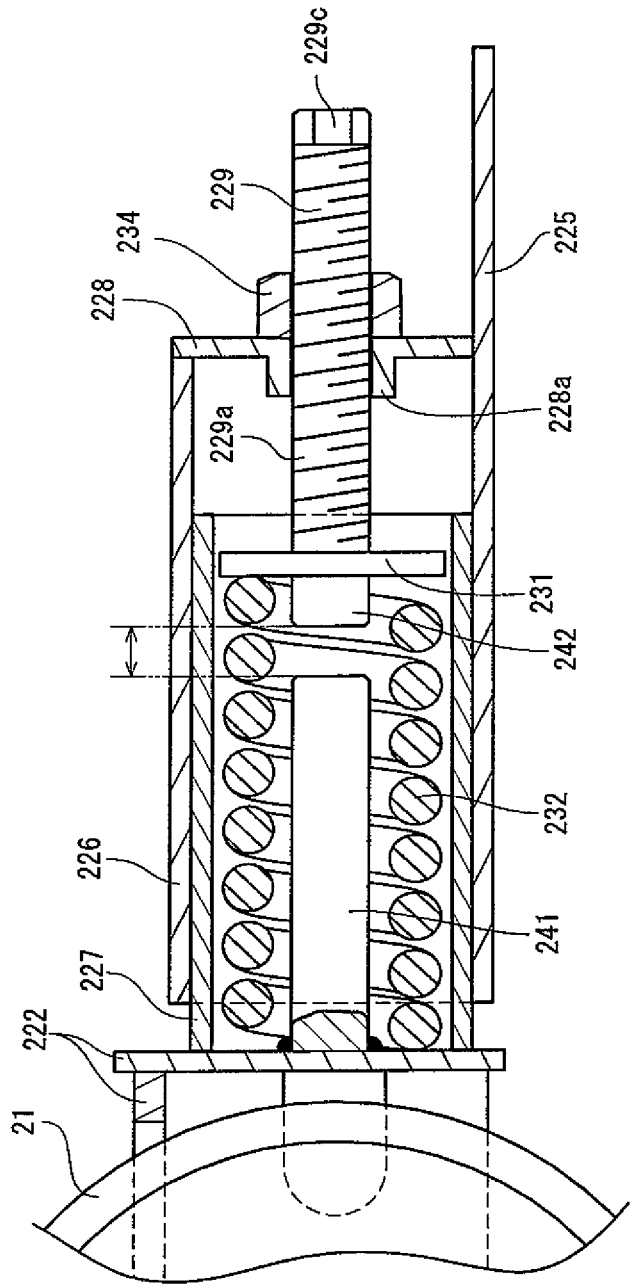
FIG. 35 is a cross sectional explanatory view of a substantial part showing the tension structure of the front driven wheel according to a modified embodiment.
Figure 36:
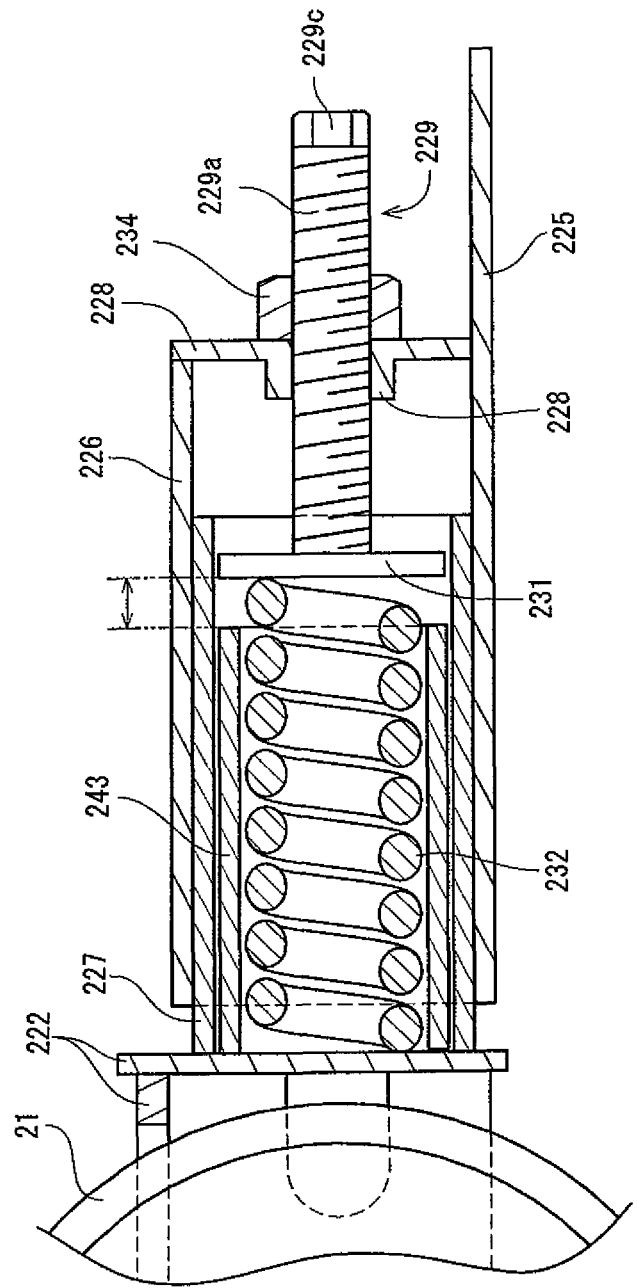
FIG. 36 is a cross sectional explanatory view of a substantial part showing the tension structure of the front driven wheel according to a modified embodiment.

As shown in FIG. 35, a spring compression stopper 242 may be provided also in the tension spring seat 231 so as to be opposed to the spring compression stopper 241 in FIG. 34, and the amount of compression of the tension spring 232 may be regulated on the basis of the contact of each of the spring compression stopper 241, 242. Further, as shown in FIG. 36, a cylindrical spring compression stopper 243 may be provided in an outer side of the tension spring 232, the tension spring seat 231 may be brought into contact with the spring compression stopper 243, and the amount of compression of the tension spring 232 may be regulated by the spring compression stopper 241.

Figure 13:
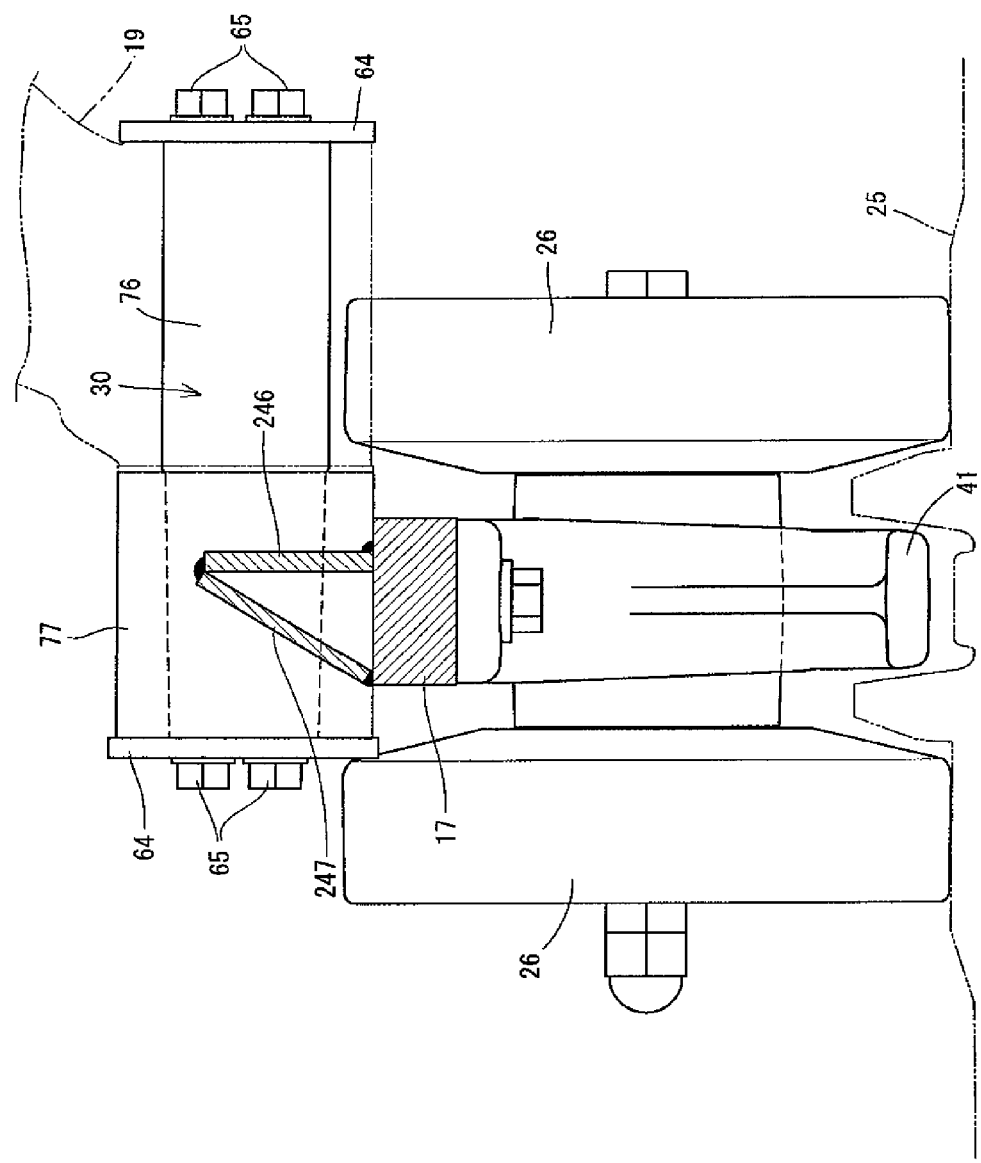
FIG. 13 is an enlarged explanatory view of a rolling wheel portion as seen from a rear side.
Figure 14:
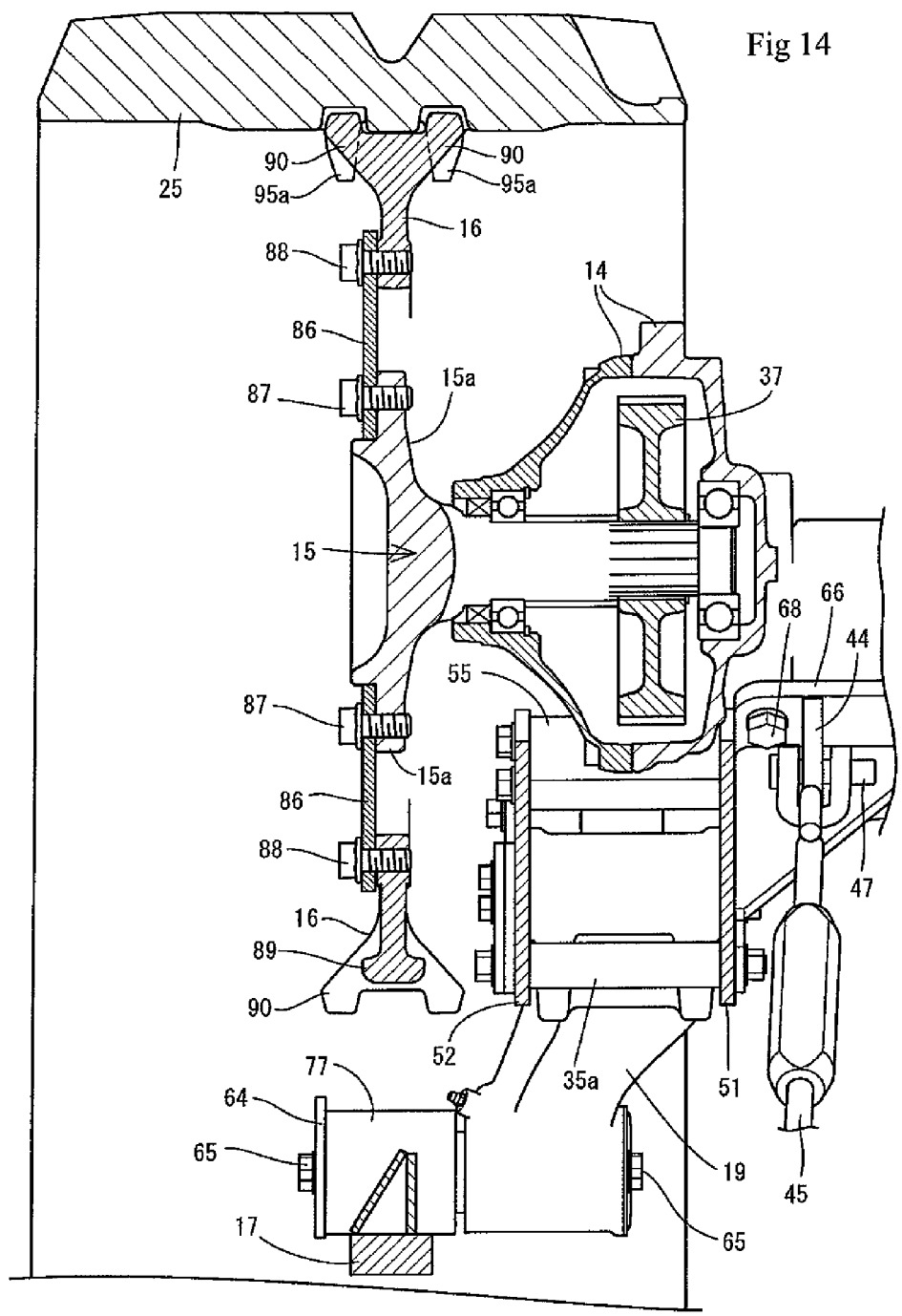
FIG. 14 is an enlarged cross sectional view of a drive wheel body portion as seen from a rear side.

A description will be given of a mud attachment preventing structure of the track frame 17 with reference to FIG. 3, FIG. 4, and FIG. 13. As shown in FIG. 3, FIG. 4, and FIG. 13, a frame reinforcing rib 246 formed as a quadrangular plate shape is provided in a rising manner and fixed to a flat upper surface between the front lower end pivot shaft 30 and the rear lower end pivot shaft 31, in a flat upper surface of the track frame 17 which is long in a back and forth direction and is formed as a square pole shape. A lower end edge of the frame reinforcing rib 246 is fixed by welding to a portion close to the machine body inner side in the flat upper surface of the track frame 17. In other words, the frame reinforcing rib 246 is arranged in an offset manner in the machine body inner side with respect to the center of the lateral width of the flat upper surface of the track frame 17.

Further, a slide down cover 247 which serves as a mud slide down body and is formed as a quadrangular plate shape is provided in the upper surface side of the track frame 17. Upper and lower end edges of the slide down cover 247 are fixed by welding to the machine body outer end portion in the flat upper surface of the track frame 17 and an upper end edge of the frame reinforcing rib 246. The frame reinforcing rib 246 and the slide down cover 247 which serve as the mud slide down body are provided in a rising manner as a chevron shape within the lateral width of the track frame 17. The slide down cover 247 is arranged as an outward chute shape. The muddy soil coming down to the upper surface of the track frame 17 slides down on the basis of a guide of the slide down cover 247, an amount of the muddy soil piled up on the upper surface of the track frame 17 is reduced, and the muddy soil is prevented from being piled on the upper surface of the track frame 17. In this case, the frame reinforcing rib 246 and the slide down cover 247 are formed as a reinforcing part of the track frame 17. Despite that it is possible to achieve a weight saving and a cost reduction of the track frame 17, it is possible to easily improve a support rigidity of the travel crawler 25.

As shown in FIG. 1, FIG. 3, FIG. 4, and FIG. 31 to FIG. 33, in the working vehicle provided with the travel machine body which mounts the engine 8 thereon, the track frame 17 which is provided in the lower side of the travel machine body 11, the travel crawler 25 which is installed to the track frame 17 via the driven wheel body 21, the outer tube body 226 and the inner tube body 227 serving as the idler fork which support the front driven wheel body 21 and can expand and contract, and the tension spring 232 which elongates the outer tube body 226 and the inner tube body 227, the tension bolt 229 is provided in the outer tube body 226 and the inner tube body 227, the force of the tension spring 232 is borne by the tension spring seat 231, and the force of the tension spring 232 is regulated by the tension bolt 229, wherein the rotation operating corner head portion 229c which serves as the operating portion of the tension bolt 229 is connected to the outer tube body 226 and the inner tube body 227 so as to be loosely rotatable, and the tension spring seat 231 is connected to the tension screw portion 229a of the tension bolt 229 via the slide tube body 230 which serves as the screwed body. Accordingly, in spite of a simple tension regulating structure which is provided with the tension bolt 229, only the operating portion 229c of the tension bolt 229 can be protruded out of the outer tube body 226 and the inner tube body 227, and it is possible to form a space for installing the tool for regulating the tension of the travel crawler 25 to the operating portion 229c wide. A working space for regulating the force of the tension spring 232 can be easily secured. Further, it is possible to omit such a bother as to use a grease injection device or the like at a time of regulating the force of the tension spring 232.

As shown in FIG. 3, FIG. 4, and FIG. 31 to FIG. 33, the positioning hole 239 to which the pin or the like can be simultaneously inserted is formed in each of a side surface portion of the outer tube body 226 which serves as a fixed side case body of the idler fork, and a side surface portion of the inner tube body 227 which serves as a movable side case body of the idler fork. Accordingly, the inner tube body 227 can be temporarily fixed to the outer tube body 226 easily by inserting the pin or the like to the positioning hole 239 in an assembling work, and it is possible to easily prevent a displacement or a dropout of the inner tube body 227. It is possible to improve an assembling workability of the tension spring 232 portion.

As shown in FIG. 3, FIG. 4, and FIG. 13, the upper surface side of the track frame 17 is provided with the frame reinforcing rib 246 or the slide down cover 247 which serves as the mud slide down body. Accordingly, even if the muddy soil comes down from a non-grounded side of the travel crawler 25, it is possible to make the muddy soil come down to the road surface side on the basis of the guide of the frame reinforcing rib 246 or the slide down cover 247, and it is possible to prevent the muddy soil from being piled up on the upper surface side of the track frame. It is possible to prevent a drive load from being increased by the muddy soil attached to the travel crawler 25 portion, and it is possible to improve a fuel consumption efficiency or the like by reducing the travel drive load. It is possible to reduce a fluctuation width of the tension of the travel crawler 25 by reducing a weight change of the travel crawler 25 portion, it is possible to stabilize a power transmission efficiency to the travel crawler 25, and it is possible to reduce a vibration or the like accompany the drive of the travel crawler 25.

As shown in FIG. 3, FIG. 4, and FIG. 13, the frame reinforcing rib 246 and the slide down cover 247 are provided in a rising manner as a chevron shape within the lateral width of the track frame 17. Accordingly, it is possible to prevent the frame reinforcing rib 246 and the slide down cover 247 from being deformed and damaged by the muddy soil or the like which is lifted up from the ground side of the travel crawler 25. Despite that it is possible to achieve a weight saving of the frame reinforcing rib 246 and the slide down cover 247, it is possible to improve a rigidity or a durability of the frame reinforcing rib 246, the slide down cover 247, and the track frame 17.

REFERENCE SIGNS LIST

1 Tiller working machine
3 Lower link
8 Engine
11 Travel machine body
12 Front wheel
15 Rear wheel
17 Track frame
19 Front link member
20 Rear link member
25 Travel crawler
26 Rolling wheel
27 Front upper end pivot shaft
28 Rear upper end pivot shaft
30 Front lower end pivot shaft
31 Rear lower end pivot shaft
X Drive resultant force line in forward moving side of travel crawler
Y Center of oscillating locus of track frame

The invention claimed is:

1. A working vehicle comprising:
a travel machine body which mounts an engine thereon;
right and left front wheels which are provided in a lower side of a front portion of the travel machine body;
a track frame which is provided in a lower side of a rear portion of the travel machine body;
right and left travel crawlers which are installed to the track frame;
a rear axle which transmits a rotating force to the travel crawler; and
an oscillation supporting point shaft which supports the track frame to the travel machine body so as to freely oscillate,
wherein the rear axle and the oscillation supporting point shaft are provided so as to be spaced, the oscillation supporting point shaft is arranged just below an axle case to which the rear axle is pivoted, and the track frame is connected to the axle case via a link member which is provided in the oscillation supporting point shaft,
wherein the oscillation supporting point shaft is formed by front and rear upper end pivot shafts and front and rear lower end pivot shafts,
wherein the front and rear upper end pivot shafts are provided in the axle case,
wherein the front and rear lower pivot shafts are provided in the track frame, and
wherein upper and lower end portions of the front and rear link members are connected to the pivot shafts, and
further comprising a plurality of rolling wheels which is provided in the track frame and support a ground side of the travel crawler,
wherein the front and rear upper end pivot shafts are arranged so as to be divided into a front side and a rear side of the rear axle, and
wherein one of the front and rear lower end pivot shafts is arrange in an upper surface side between the plurality of rolling wheels in the upper surface side of the track frame.

2. The working vehicle according claim 1, wherein a rear portion ground side of the travel crawler is supported to the track frame via the driven wheel body, and
wherein the other of the front and rear lower end pivot shafts is arranged in the upper surface side of the track frame and between the rolling wheel which is adjacent to the driven wheel body in the plurality of rolling wheels and the driven wheel body.

3. The working vehicle according to claim 1, wherein the front and rear link members are arranged so as to be tapered in a side elevational view of the machine body, and
a distance in the upper end side of the front and rear link members is larger than a distance in the lower end side of the front and rear link members.

4. The working vehicle according to claim 1,
wherein the front and rear upper end pivot shafts are arranged in the vicinity of a drive resultant force line in a forward moving side of the travel crawler,
wherein the front side upper end pivot shaft is arranged below the drive resultant force line, and
wherein a center of an oscillating locus of the track frame is below the drive resultant force line.

5. The working vehicle according to claim 1,
wherein the front and rear lower end pivot shafts are provided in the track frame within a lateral width of the travel crawler, and
wherein each of the lower end sides of the front and rear link members is offset to the track frame side.

6. The working vehicle according to claim 2, wherein the front and rear link members are arranged so as to be tapered in a side elevational view of the machine body, and
a distance in the upper end side of the front and rear link members is larger than a distance in the lower end side of the front and rear link members.

7. The working vehicle according to claim 1,
wherein the front and rear upper end pivot shafts are arranged in the vicinity of a drive resultant force line in a forward moving side of the travel crawler,
wherein the front side upper end pivot shaft is arranged below the drive resultant force line, and
wherein a center of an oscillating locus of the track frame is blow the drive resultant force line.

8. The working vehicle according to claim 2, wherein the front and rear upper end pivot shafts are arranged in the vicinity of a drive resultant force line in a forward moving side of the travel crawler,
the front side upper end pivot shaft is arranged below the drive resultant force line, and
a center of an oscillating locus of the track frame is blow the drive resultant force line.

9. The working vehicle according to claim 1,
wherein the front and rear lower end pivot shafts are provided in the track frame within a lateral width of the travel crawler, and
wherein each of the lower end sides of the front and rear link members is offset to the track frame side.

10. The working vehicle according to claim 2, wherein the front and rear lower end pivot shafts are provided in the track frame within a lateral width of the travel crawler, and
each of the lower end sides of the front and rear link members is offset to the track frame side.

* * * * *